United States Patent
Miyahara et al.

(10) Patent No.: US 6,488,101 B1
(45) Date of Patent: Dec. 3, 2002

(54) TILLER

(75) Inventors: Kazuyoshi Miyahara, Wako (JP);
Hideaki Kobayashi, Wako (JP);
Masatoshi Nagaoka, Wako (JP);
Masashi Takeuchi, Wako (JP);
Tomoaki Ishikawa, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/651,814

(22) Filed: Aug. 30, 2000

(30) Foreign Application Priority Data

Sep. 2, 1999 (JP) .......................... 11-248686
Sep. 2, 1999 (JP) .......................... 11-248863

(51) Int. Cl.$^7$ .............................................. A01B 33/00
(52) U.S. Cl. ............................ 172/46; 172/42; 172/351
(58) Field of Search ........................... 172/42, 44, 48, 172/329, 351, 365, 35, 125, 107, 118, 46

(56) References Cited

U.S. PATENT DOCUMENTS

| | | | | |
|---|---|---|---|---|
| 1,320,469 A | * | 11/1919 | Hicks | 111/14 |
| 1,682,224 A | * | 8/1928 | Hicks | 172/46 |
| 2,400,204 A | * | 5/1946 | Lindskog | 172/42 |
| 3,123,149 A | * | 3/1964 | White | 172/42 |
| 3,892,278 A | * | 7/1975 | Smith et al. | 172/70 |
| 4,402,366 A | * | 9/1983 | Dankel | 172/43 |
| 4,483,400 A | * | 11/1984 | Arndt | 172/42 |
| 4,519,459 A | * | 5/1985 | Reaume | 172/42 |
| 4,802,536 A | * | 2/1989 | O'Neal | 172/42 |
| 5,048,616 A | * | 9/1991 | Hoff | 172/42 |
| 5,224,552 A | * | 7/1993 | Lee et al. | 172/113 |
| 5,353,881 A | * | 10/1994 | Lee et al. | 172/113 |
| 6,017,169 A | * | 1/2000 | Toor et al. | 172/118 |

FOREIGN PATENT DOCUMENTS

| | | | | |
|---|---|---|---|---|
| FR | 2569938 | * | 9/1984 | 172/42 |
| GB | 2104361 | * | 3/1983 | 172/74 |
| JP | 57086502 | | 5/1982 | |
| JP | 6003002 | | 1/1994 | |

\* cited by examiner

Primary Examiner—Thomas B. Will
Assistant Examiner—Nathan Mammen
(74) Attorney, Agent, or Firm—Adams & Wilks

(57) ABSTRACT

A tiller for cultivating soil has a power source and a tilling shaft mounted for undergoing rotation by a driving force supplied from the power source. The tilling shaft has a hollow outer shaft and an inner shaft extending through the outer shaft. The inner shaft has a variable rotating speed and/or direction of rotation relative to the outer shaft. A power transmission mechanism transmits a driving force from the power source to the tilling shaft. The power transmission mechanism has a first power transmission system for transmitting the driving force from the power source to the outer shaft and a second power transmission system transmitting the driving force from the power source to the inner shaft. The second power transmission system has a hydrostatic transmission comprised of a hydraulic pump and a hydraulic motor for effecting a stepless change of the rotating speed of the inner shaft as well as a selective change of its direction of rotation. Tilling claws are disposed on the tilling shaft for tilling soil.

12 Claims, 18 Drawing Sheets

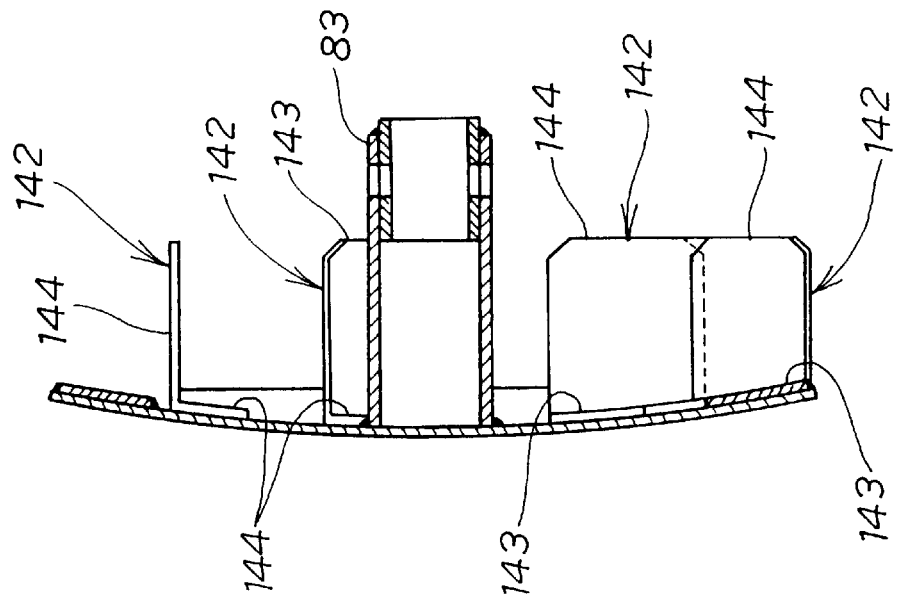
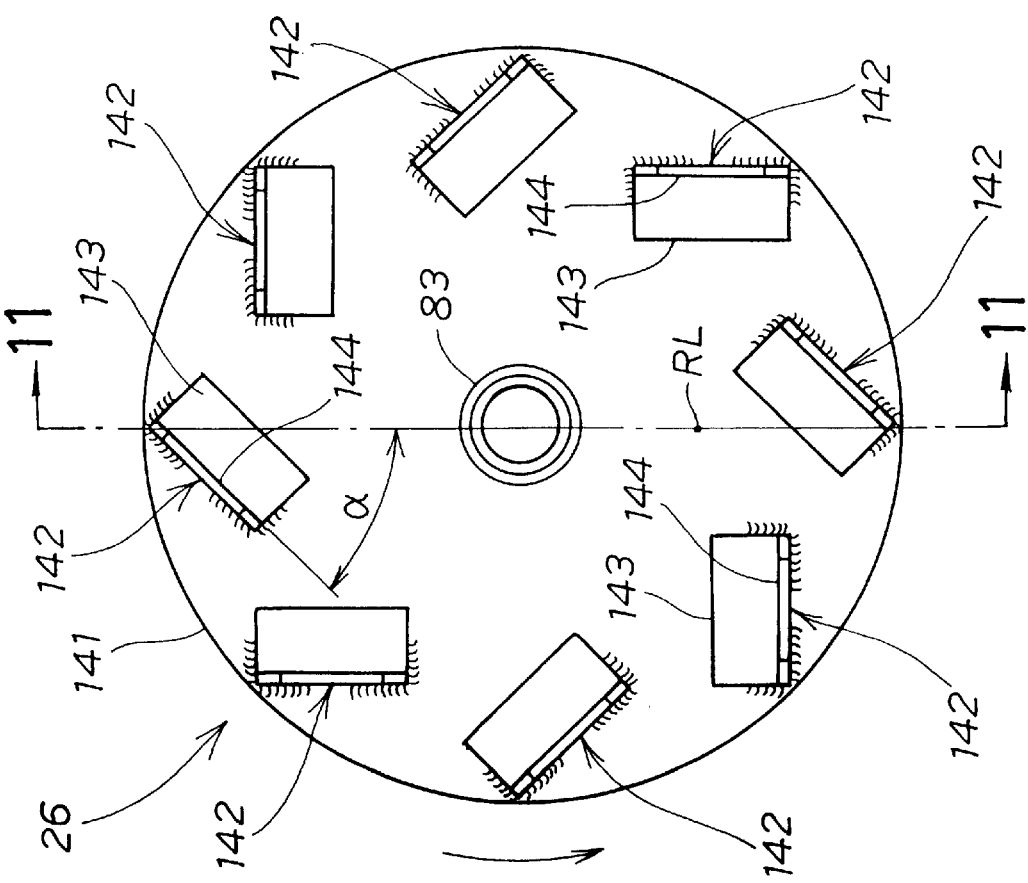

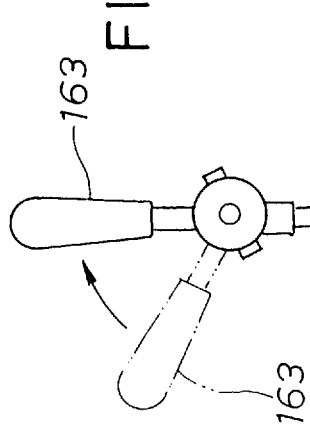 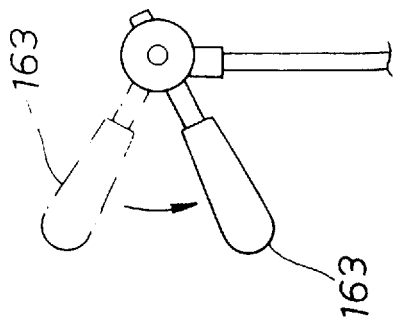
FIG.14A  FIG.14B
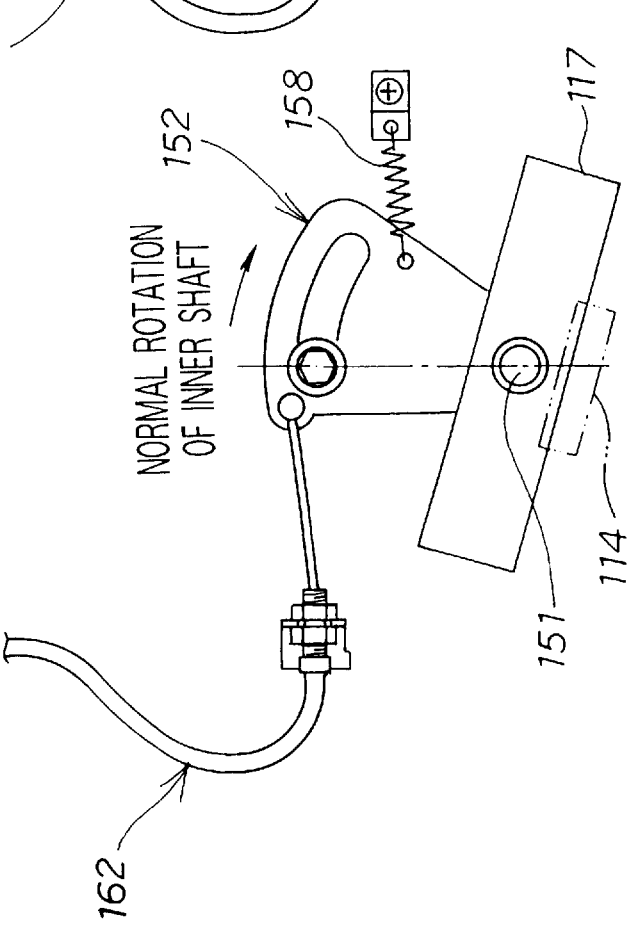 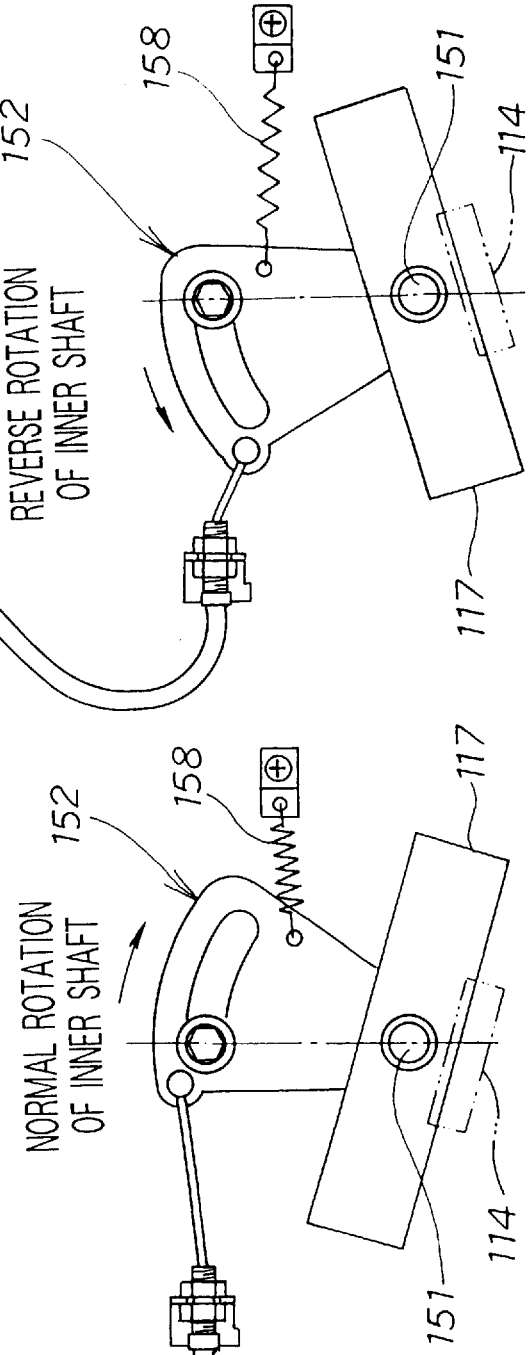
NORMAL ROTATION OF INNER SHAFT
REVERSE ROTATION OF INNER SHAFT

NORMAL ROTATION OF INNER SHAFT

REVERSE ROTATION OF INNER SHAFT

TILLER

BACKGROUND OF THE INVENTION

1. Field of the Invention

The present invention relates to a tiller which is operable with a variable driving force and under variable tilling conditions, depending on the soil.

2. Description of the Related Art

A small tiller as disclosed in, for example, Japanese Utility Model Laid-Open Publication No. SHO-57-86502 is known as a controlled machine having tilling claws attached to a tilling shaft rotatably for cultivating the soil with the forward movement of the machine, as well as allowing it to run on a road. The machine has a plurality of appropriately spaced apart tilling claws attached to the tilling shaft extending transversely under its main body, a rearwardly extending operating handlebar, and a resistance bar extending rearwardly and downwardly from its main body.

As the tilling claws serve also as traveling wheels, however, the machine requires a great deal of labor and skill for its operation, since the nature of the soil may disable it to keep a good balance between its driving force and tillage, and call for a change of the tilling conditions. If the soil is hard, the machine suffers from a serious lowering of its operability due to a dashing phenomenon, since the tilling claws do not cut into the ground, but roll thereon and cause the machine to move forward uselessly. If the soil is soft, the machine has a lower working efficiency, as it is likely to work on the soil to an unnecessary extent and have a lower driving force.

A small tiller as disclosed in, for example, Japanese Utility Model Laid-Open Publication No. HEI-6-3002 is known as having been devised to solve those problems. The tiller has a connecting shaft connected to a tilling shaft, which is the output shaft of a transmission, and carrying tilling claws on its portion close to the transmission. The connecting shaft also carries thereon a planetary gear mechanism composed of a sun gear formed on its middle portion, a plurality of planet gears meshing with the sun gear and gear shafts each attached rotatably to the center of one of the planet gears. Traveling wheels are attached to the gear shafts of the planetary gear mechanism by bosses. A ring gear is rotatably fitted to the connecting shaft. The ring gear has a toothed inner periphery meshing with the planet gears. The ring gear is secured to a fender fixed to the transmission. The rotation of the tilling shaft is transmitted to the traveling wheels by the planetary gear mechanism, so that the traveling wheels may be rotated at a reduced speed relative to the tilling claws rotating with the tilling shaft. As the wheels have a fixed reduction ratio relative to the tilling shaft, however, the wheels have a fixed driving force for moving the machine forward, and under certain soil conditions, therefore, it is impossible to obtain the desired driving force for achieving any adequate tilling work. The tiller is so designed that a part of the planetary gear mechanism may be altered in structure to reverse the rotation of the traveling wheels relative to the tilling claws, but its structural alteration is a large-scaled and complicated job.

SUMMARY OF THE INVENTION

It is, therefore, an object of this invention to provide a tiller which can always maintain stability in operation to achieve an improved finish of tilling, a reduction of dashing and an improved ability to move forward irrespective of the conditions of the soil.

According to an aspect of this invention, there is provided a tiller for cultivating the soil, having a power source, a tilling shaft rotatable by a driving force supplied to it from the power source through a power transmission, and a plurality of tilling claws carried on the tilling shaft, the tilling shaft being a concentric dual-shaft structure having a hollow outer shaft and an inner shaft extending through the outer shaft, the inner shaft having its rotating speed and/or its direction of rotation variable relative to the outer shaft.

If the rotating speed of the inner shaft or its direction of rotation is altered relative to the outer shaft, it is easily possible to alter the tilling conditions as required to suit the nature of the soil of a field and thereby obtain the desired tillage and tilling speed, so that the tiller of this invention can maintain stability in operation despite any change in the nature of the soil. The alteration of the rotating speed of the inner shaft is particularly useful, as it makes it possible to select any tillage and tilling speed from a finely divided range to thereby obtain the soil which is suitable for growing any of various kinds of crops.

The power transmission may be composed of a first power transmission system for transmitting a driving force from the power source to the outer shaft and a second power transmission system for transmitting a driving force from the power source to the inner shaft, the second power transmission system including a hydrostatic transmission composed of a hydraulic pump and a hydraulic motor, as will be described more specifically. The hydrostatic transmission makes it possible to change the rotating speed of the inner shaft in a stepless way and control its direction of rotation selectively as desired.

In a preferred form, the outer and inner shafts are fitted with a plurality of tilling claws. The tiller can easily be moved backward on the ground if the inner shaft is rotated at an increased speed in the opposite direction to the outer shaft. The dashing of the tiller can be prevented during the tilling of hard soil by the rotation of the outer and inner shafts in the same direction if the inner shaft is rotated at a lower speed than the outer shaft, since the force for driving the tiller by the tilling claws fitted on the outer shaft is restrained by the claws on the inner shaft.

A side disk is fitted on each of the opposite ends of the inner shaft, and a plurality of tilling claws are fitted on the outer shaft. Each side disk is provided on its inner surface with a plurality of upstanding plates each lying at an angle to the radius of the disk for producing a greater amount of friction with the soil. The friction force produced in the soil by the upstanding plates on the side disks enables the tiller to remain stable on both sides throughout its operation to thereby achieve an improved straight drive. If the rotating speed of the side disks on the inner shaft or their direction of rotation is altered relative to the tilling claws on the outer shaft, it is possible to vary the driving force of the side disks as desired, so that the tilling conditions can easily be altered to suit the nature of the soil to realize any desired tillage and tilling speed. The alteration of the rotating speed of the side disks is particularly useful, since it makes it possible to select any tilling speed from a finely divided range and thereby control tillage as desired. Thus, this invention makes it possible to realize an adequate tilling speed for achieving an improved operating efficiency and the desired control of tillage for making the soil suitable for growing any of various kinds of crops.

BRIEF DESCRIPTION OF THE DRAWINGS

A preferred embodiment of this invention will now be described in detail, by way of example only, with reference to the accompanying drawings, in which:

FIG. 10 is a front elevational view of one of the side disks shown in FIG. 3;

FIG. 11 is a sectional view taken along the line 11—11 of FIG. 10;

FIGS. 14A and 14B are a set of views illustrating the adjustment of inclination of an inclined plate by the lever shown in FIG. 12;

DETAILED DESCRIPTION OF THE PREFERRED EMBODIMENT

The following description is merely exemplary in nature and is in no way intended to limit the invention, its application or uses.

Figure 1:
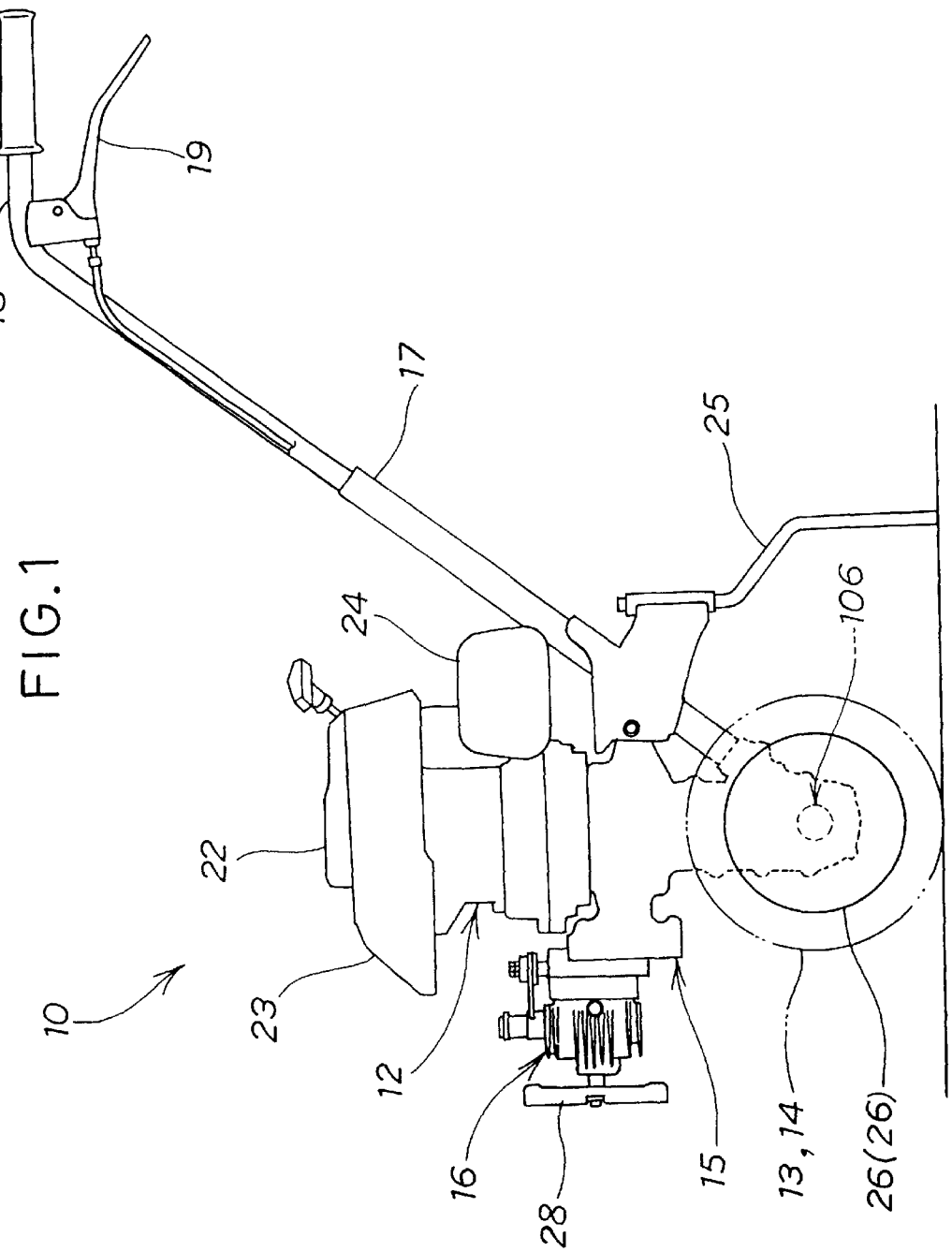
FIG. 1 is a side elevational view of a small tiller embodying this invention.

Referring to FIG. 1, a small tiller 10 has an engine 12 as a power source, a gear casing 15 mounted under the engine 12 for transmitting power from the engine 12 to a plurality of tilling claws 13 and 14, a hydrostatic transmission 16 mounted in front of the gear casing 15, a handle post 17 extending rearwardly and upwardly from the gear casing 15, a handlebar 18 attached to the top of the handle post 17 and a clutch lever 19 attached to the handlebar 18. A fuel tank is shown at 22, an engine cover at 23, an air strainer at 24, and a pair of side disks at 26 (only one of which is shown), and a fan shown at 28 has a cover not shown.

Figure 2:
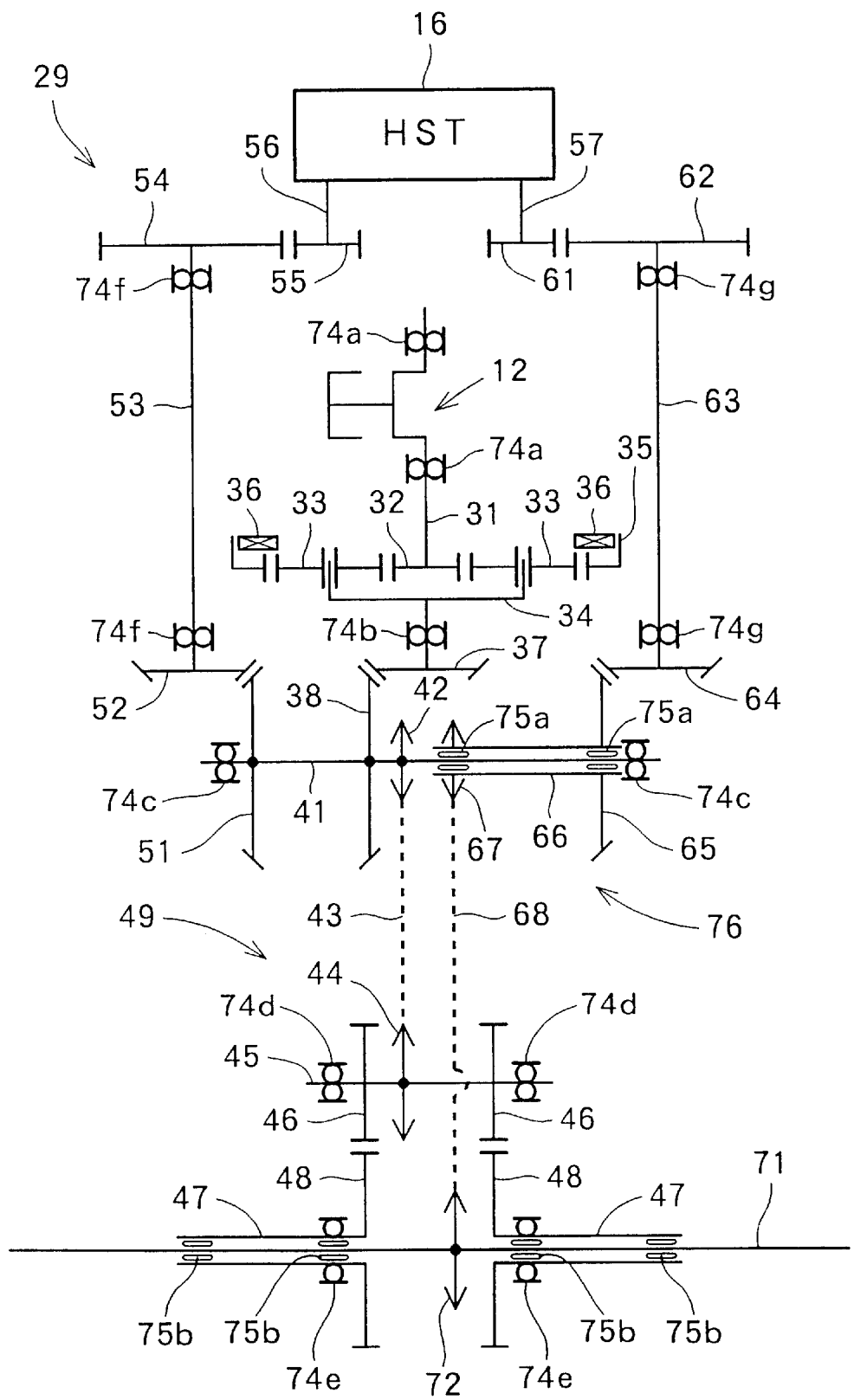
FIG. 2 is a circuit diagram showing the transmission of power in the tiller shown in FIG. 1.

FIG. 2 is a diagram showing the transmission of power in the tiller. A power transmission 29 for transmitting power from the engine 12 to a tilling shaft (to be described), to which the tilling claws 13 and 14 (FIG. 1) are attached, includes a crank gear 32 connected to the distal end of a crankshaft 31 extending from the engine 12. A plurality of planet gears 33 mesh with the crank gear 32. The planet gears 33 are rotatably supported by a planet carrier 34. The planet gears 33 mesh with a ring gear 35. A plurality of brake shoes 36 are engageable with the inner periphery of the ring gear 35. A first bevel gear 37 is attached to the planet carrier 34. A second bevel gear 38 meshes with the first bevel gear 37. The second bevel gear 38 has a first supporting shaft 41.

The first supporting shaft 41 carries an outer drive sprocket 42 thereon. An outer driven sprocket 44 is connected to the outer drive sprocket 42 by an outer drive chain 43. The outer driven sprocket 44 has a second supporting shaft 45. A pair of transversely spaced apart outer drive gears 46 are carried on the second supporting shaft 45. A pair of transversely spaced apart outer driven gears 48 mesh with the outer drive gears 46, respectively. The outer driven gears 48 have outer shafts 47 which are rotatable with the tilling claws 13 and 14. A system for transmitting power from the engine 12 to the outer shafts 47 is a first power transmission system 49 (which excludes the engine 12 and the outer shafts 47).

A third bevel gear 51 is carried on the first supporting shaft 41. A fourth bevel gear 52 meshes with the third bevel gear 51. The fourth bevel gear 52 has a third supporting shaft 53. A pump drive gear 54 is carried on the third supporting shaft 53. A pump driven gear 55 meshes with the pump drive gear 54. The pump driven gear 55 has a pump axle 56. The pump axle 56 is connected to the hydrostatic transmission (HST) 16. The HST 16 effects a stepless change of the rotating speed of the pump axle 56 and rotates a motor axle 57 by varying its direction of rotation as desired.

The motor axle 57 carries a motor drive gear 61 thereon. A motor driven gear 62 meshes with the motor drive gear 61. The motor driven gear 62 has a fourth supporting shaft 63. A fifth bevel gear 64 is carried on the fourth supporting shaft 63. A sixth bevel gear 65 meshes with the fifth bevel gear 64. The sixth bevel gear 65 has a fifth supporting shaft 66. The fifth supporting shaft 66 is connected about the first supporting shaft 41 rotatably relative to it. An inner drive sprocket 67 is carried on the fifth supporting shaft 66. An inner driven sprocket 72 is connected to the inner drive sprocket 67 by an inner drive chain 68. The inner driven sprocket 72 is connected to an inner shaft 71 extending through the outer shafts 47 which are hollow. Ball bearings are shown at 74a to 74g, and needle bearings at 75a and 75b. A system for transmitting power from the engine 12 to the inner shaft 71 is a second power transmission system 76 (which excludes the engine 12 and the inner shaft 71).

Figure 3:
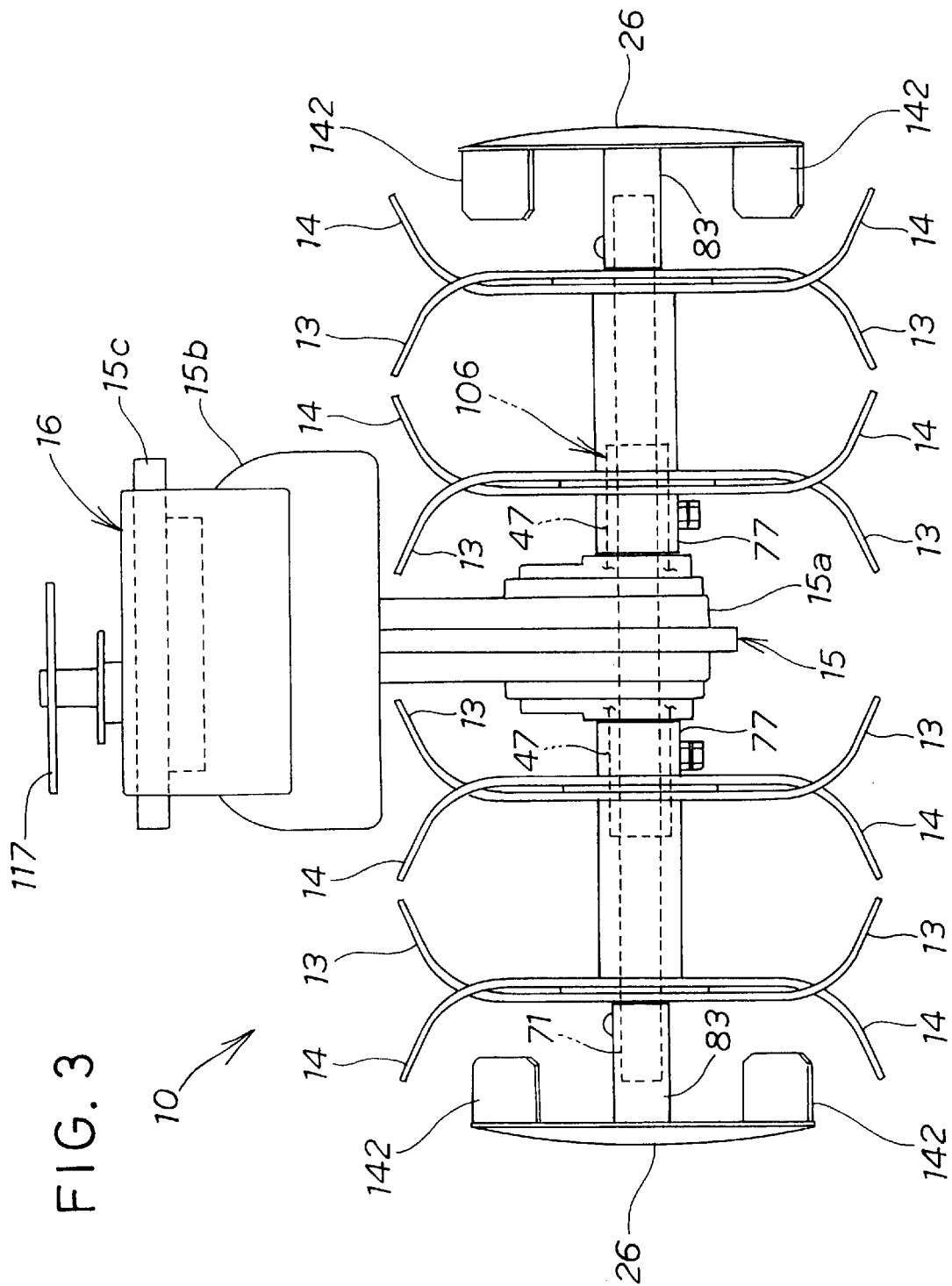
FIG. 3 is a front elevational view of a lower portion of the tiller.

FIG. 3 shows examples of tilling claws and side disks on the tiller 10. The tiller 10 has the gear casing 15 situated in its central portion. The gear casing 15 has a lower casing portion 15a from which the hollow outer shafts 47 project laterally in the opposite directions. A plurality of tilling claws 13 each curved inwardly at both ends and a plurality of tilling claws 14 each curved outwardly at both ends are attached to the outer shafts 47 by brackets 77. The inner shaft 71 extends transversely through the gear casing 15 and the outer shafts 47. Each side disk 26 has a boss 83 into which the inner shaft 71 is connected at one end. An upper portion of the gear casing 15 is shown at 15b, and a clutch casing at 15c. The construction of the side disks 26 will be described later with reference to FIGS. 10A and 10B.

Figure 4:
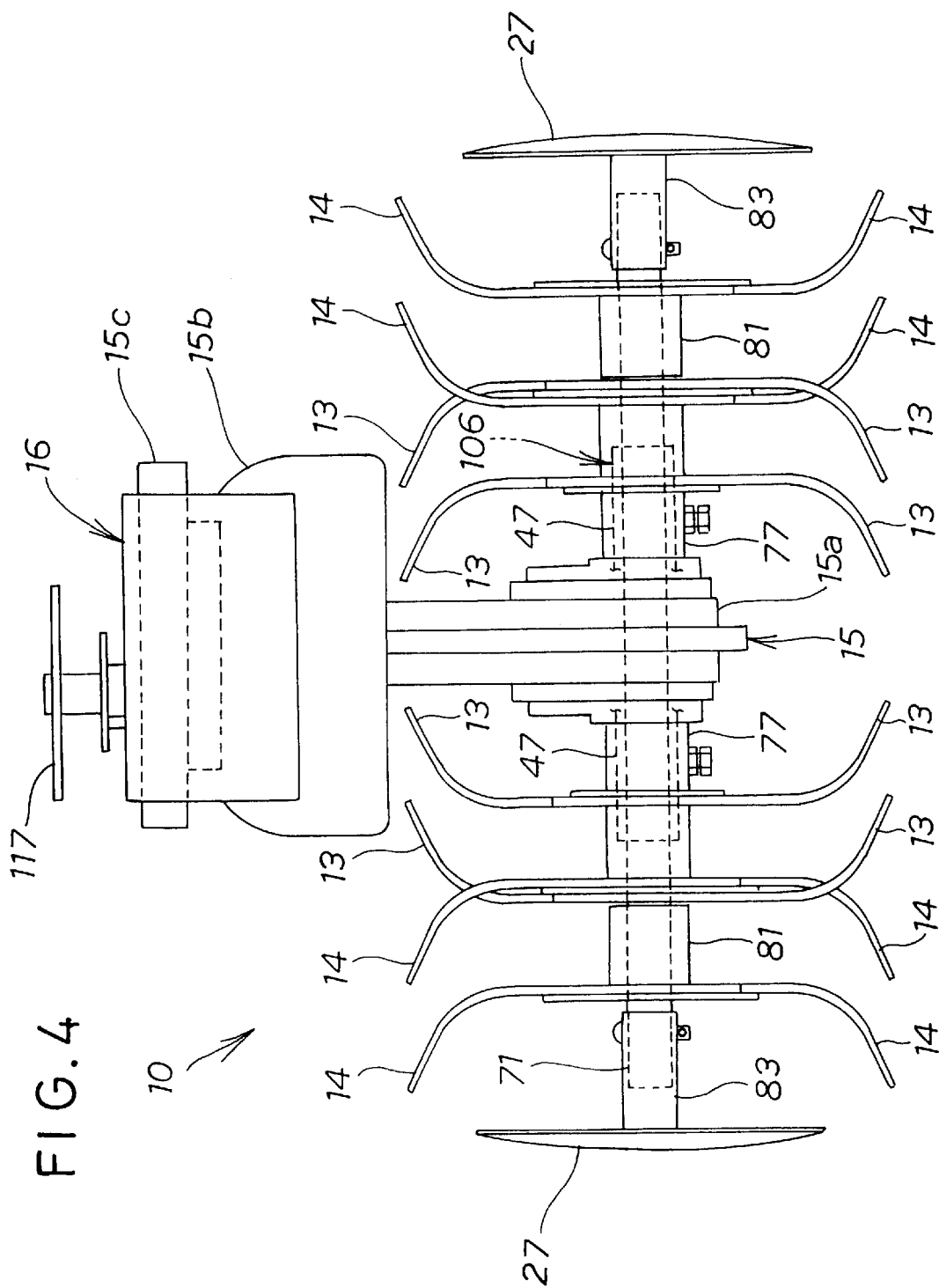
FIG. 4 is a view similar to FIG. 3, but showing a different form of side disks.

FIG. 4 shows other examples of tilling claws and side disks on the tiller 10, the side disks being of the same construction with known side disks. Two outermost tilling claws 14 are attached to the inner shaft 71 by two brackets 81, respectively. In the other aspects of construction, the tiller 10 shown in FIG. 4 is equal to that shown in FIG. 3.

Figure 5:
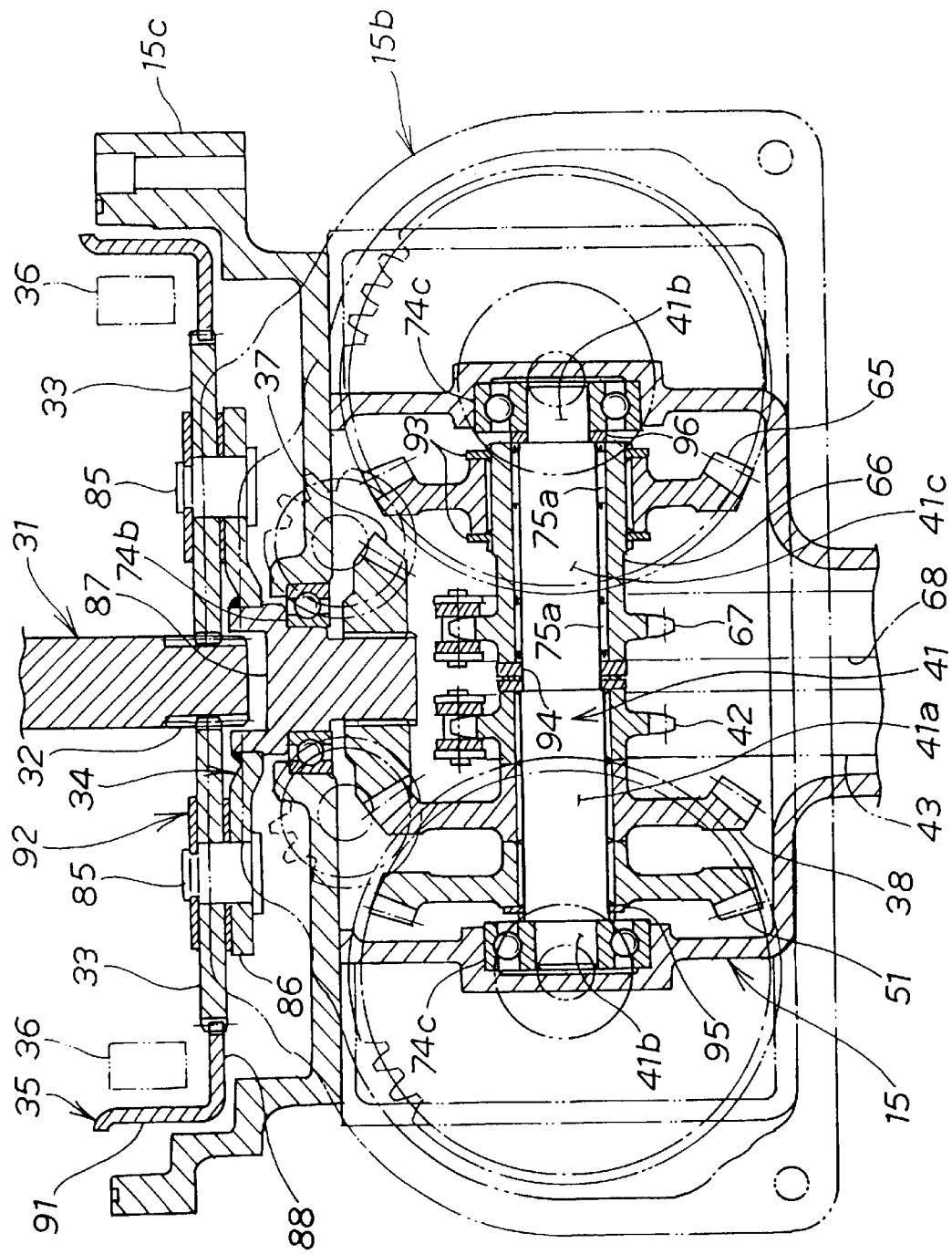
FIG. 5 is an enlarged sectional view of the upper casing of the tiller shown in FIG. 3.

FIG. 5 is a sectional view showing the arrangement of gears in the upper casing portion and clutch casing shown in FIG. 3. Each of the two transversely spaced apart planet gears 33 in the clutch casing 15c is attached to the planet carrier 34 by a rotary shaft 85. The planet carrier 34 is composed of a disk portion 86 and a shaft portion 87 fitted to the center of the disk portion 86 and having an end splined to the first bevel gear 37. The shaft portion 87 is supported rotatably by the ball bearing 74b on the clutch casing 15c. The ring gear 35 is composed of a disk portion 88 having an inner periphery engaging with the planet gears 33 and a cylindrical portion 91 extending from the outer periphery of the disk portion 88. The brake shoes 36 are engageable with the inner peripheral surface of the cylindrical portion 91 of the ring gear 35 for holding the ring gear 35 against rotation in the clutch casing 15c. The planet gears 33, rotary shafts 85, planet carrier 34, ring gear 35, and brake shoes 36 form a clutch mechanism 92.

The clutch mechanism 92 is so operated that when the brake shoes 36 stay away from the cylindrical portion 91 of the ring gear 35, the rotation of the crankshaft 31 is transmitted to the ring gear 35 by the planet gears 33, but not to the planet carrier 34. If the brake shoes 36 are held against the inner surface of the cylindrical portion 91, the rotation of the ring gear 35 is stopped, and the rotation of the crankshaft 31 is transmitted to the planet carrier 34 by the planet gears 33, whereby the first bevel gear 37 is rotated. A semiclutched situation occurs if the rotation of the ring gear 35 is not completely stopped by the brake shoes 36.

Description will now be made of the arrangement of gears, etc. in the upper casing portion 15b. The second bevel gear 38, outer drive sprocket 42, and third bevel gear 51 are splined to the large diameter portion 41a of the first supporting shaft 41. The first supporting shaft 41 has at both ends thereof small diameter portions 41b supported rotatably by the ball bearings 74c on the upper casing portion 15b. The sixth bevel gear 65 is splined to the fifth supporting shaft 66 and has its opposite ends secured to the fifth supporting shaft 66 by retaining rings 93. The fifth supporting shaft 66 is supported rotatably by the needle bearings 75a on the medium diameter portion 41c of the first supporting shaft 41. The fifth supporting shaft 66 has the inner drive sprocket 67 as an integral part thereof. A thrust bearing is shown at 94, and collars at 95 and 96.

Figure 6:
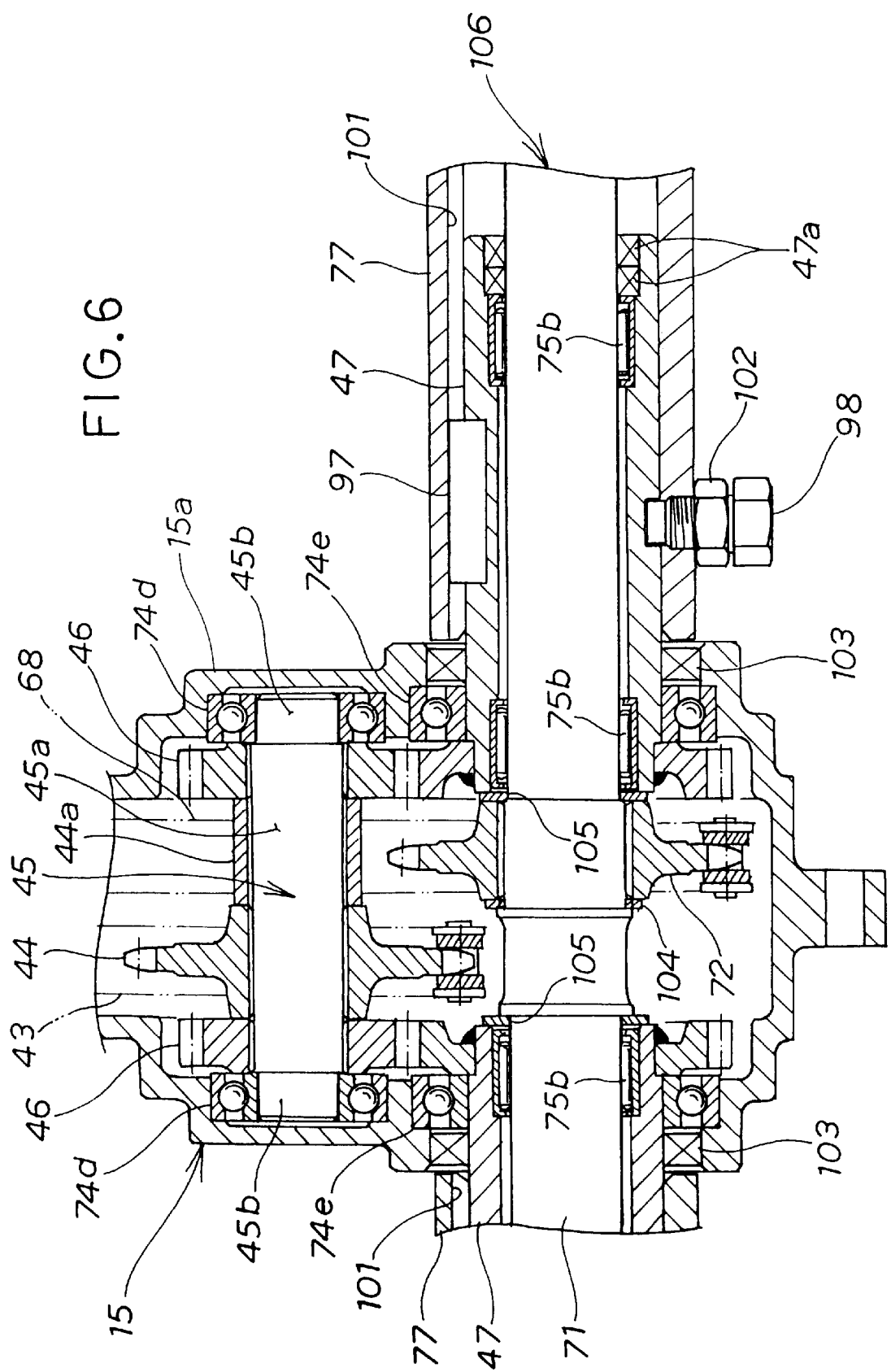
FIG. 6 is an enlarged sectional view of the lower casing of the tiller shown in FIG. 3.

FIG. 6 is a vertical sectional view of the lower portion 15a of the gear casing 15 shown in FIG. 3. The outer driven sprocket 44 and the outer drive gears 46 are splined to the large diameter portion 45a of the second supporting shaft 45, as shown in FIG. 6. A collar for positioning the outer driven sprocket 44 is shown at 44a. The second supporting shaft 45 has at both ends thereof small diameter portions 45b at which it is supported rotatably by the ball bearings 74d on the lower casing portion 15a. The outer shafts 47 are mounted rotatably by the ball bearings 74e on the lower casing portion 15a. Each outer shaft 47 is a hollow shaft held against rotation in a bracket 77 by a key 97 (only the key for one of the shafts is shown), and held against axial displacement by a bolt 98 (only the bolt for one of the shafts is shown). Oil seals are shown at 47a, and each bracket 77 has a key groove 101 for the insertion of the key 97. Each bolt 98 is locked by a nut 102 (only the lock nut for one of the bolts is shown), and oil seals are shown at 103. The inner shaft 71 is supported in the outer shafts 47 rotatably by the needle bearings 75b provided on the inner surfaces of the outer shafts 47. The inner driven sprocket 72 is splined to the middle portion of the inner shaft 71. A stop ring 104 is provided at one end of the inner driven sprocket 72 for restraining its movement in one axial direction. A thrust bearing 105 is interposed between each outer shaft 47 and the middle portion of the inner shaft 71. The outer shafts 47, inner shaft 71, and needle bearings 75b form a tilling shaft 106.

Figure 7:
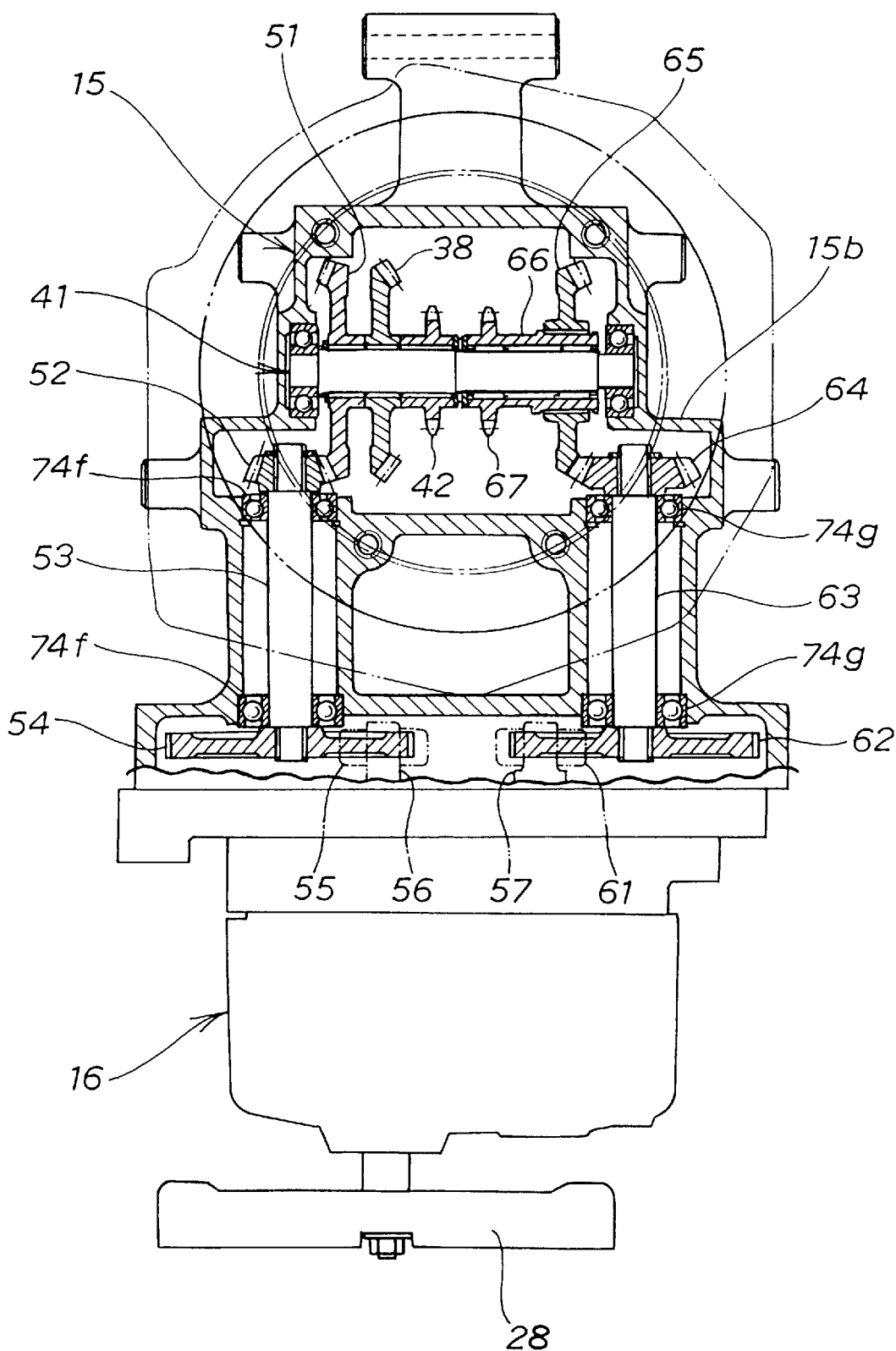
FIG. 7 is a horizontal sectional view of the upper casing of the tiller shown in FIG. 3.

FIG. 7 is a top plan view, partly in section, of the upper portion of the gear casing 15. The third supporting shaft 53 lies at right angles to the first supporting shaft 41 and is connected thereto by the third and fourth bevel gears 51 and 52. The third supporting shaft 53 is supported by the ball bearings 74f on the upper casing portion 15b. The third supporting shaft 53 is splined at one end to the pump drive gear 54. The fourth supporting shaft 63 lies at right angles to the fifth supporting shaft 66 fitted about the first supporting shaft 41 and is connected to the fifth supporting shaft by the fifth and sixth bevel gears 64 and 65. The fourth supporting shaft 63 is supported rotatably by the ball bearings 74g on the upper casing portion 15b, and is splined at one end to the motor driven gear 62.

Figure 8:
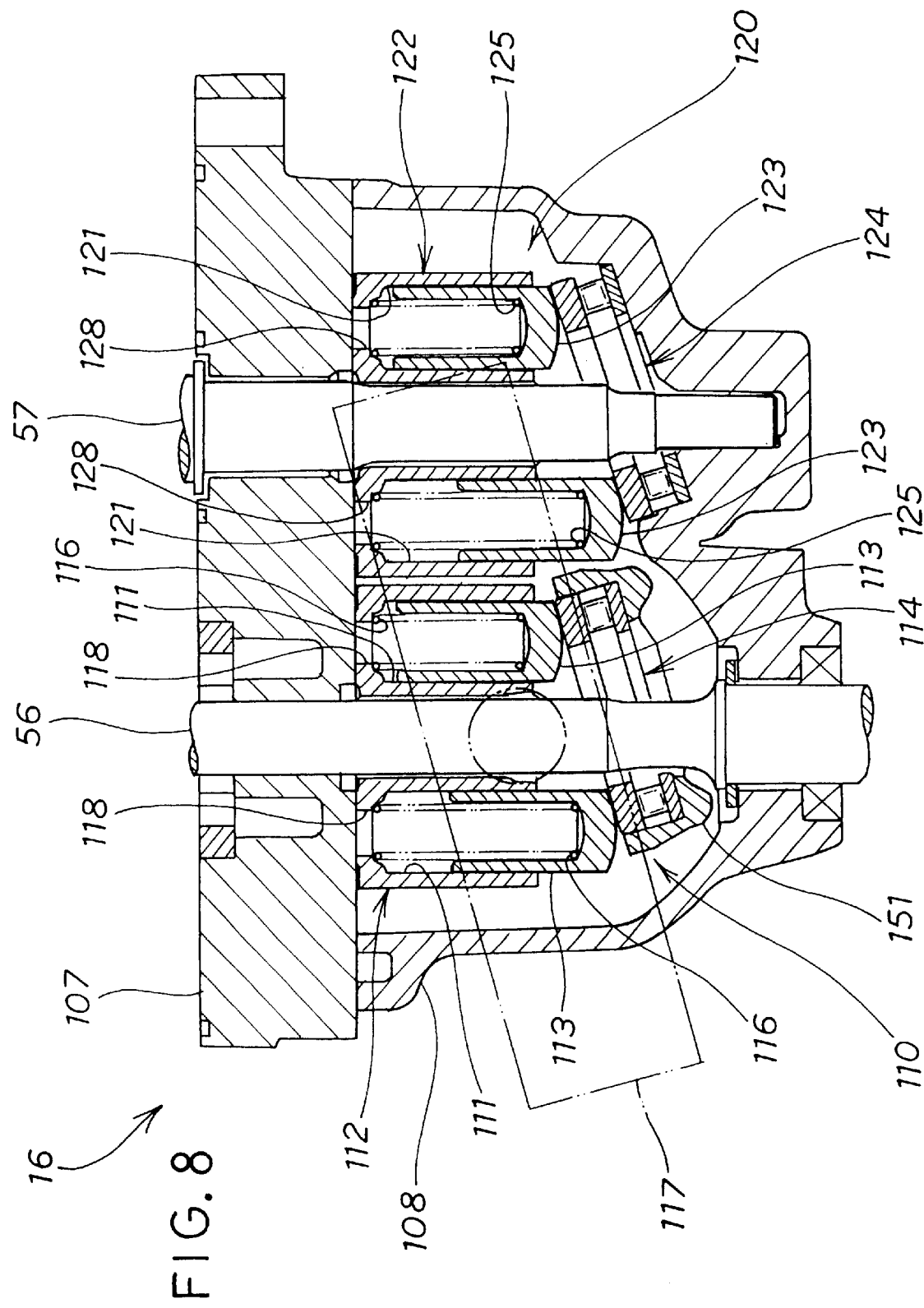
FIG. 8 is a horizontal sectional view of the hydrostatic transmission shown in FIG. 1.

FIG. 8 is an enlarged top plan view, partly in section, of the HST 16 in the tiller. The HST 16 has a base 107 mounted to the gear casing 15 (see FIG. 7), a casing 108 attached to the base 107, and a hydraulic pump 110 and a hydraulic motor 120 having their principal parts located within the base 107 and the casing 108, as shown in FIG. 8. The base 107 and the casing 108 support the pump axle 56 and the motor axle 57 rotatably. The hydraulic pump 110 is a device for generating a hydraulic pressure by the rotation of the pump axle 56. The hydraulic pump 110 is composed of the pump axle 56, a cylinder block 112 splined to the pump axle 56 and having a plurality of cylinders 111, a plurality of plungers 113 each fitted slidably in one of the cylinders 111, an inclined plate 114 contacting the ends of the plungers 113, an inclined plate shaft 151 supporting the inclined plate 114 (as will be described), springs 116 urging the plungers 113 against the inclined plate 114, and a handle 117 attached to the inclined plate shaft 151 for altering the inclination of the inclined plate 114. Each cylinder 111 has a port 118 through which oil is allowed to flow between the cylinder and an oil passage formed in the base 107, but not shown. The inclined plate 114 is a thrust bearing having one of its track disks secured to the inclined plate shaft 151, while the other contacts the ends of the plungers 113.

The hydraulic motor 120 is a device for rotating the motor axle 57 by the hydraulic pressure generated by the hydraulic pump 110. The hydraulic motor 120 is composed of the motor axle 57, a cylinder block 122 splined to the motor axle 57 and having a plurality of cylinders 121, a plurality of plungers 123 each fitted slidably in one of the cylinders 121, an inclined plate 124 contacting the ends of the plungers 123, and springs 125 urging the plungers 123 against the inclined plate 124. Each cylinder 121 has a port 128 through which oil is allowed to flow between the cylinder and an oil passage formed in the base 107, but not shown. The inclined plate 124 is a thrust bearing having one of its track disks secured to the casing 108, while the other contacts the ends of the plungers 123.

Figure 9:
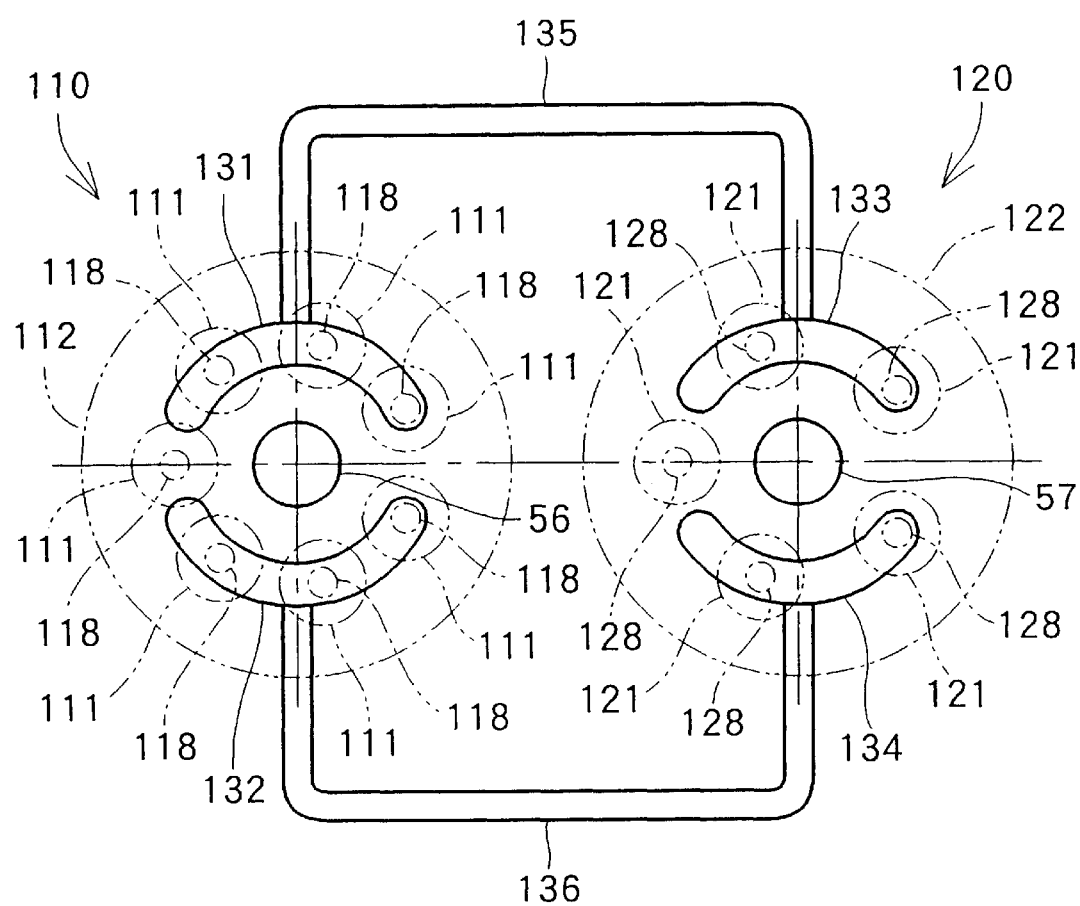
FIG. 9 is a view showing an oil passage in the hydrostatic transmission shown in FIG. 8.

FIG. 9 is a diagram showing the oil passages in the HST of the tiller. The hydraulic pump 110 has the cylinders 111 formed along the circumference of the cylinder block 112. The base 107 (see FIG. 8) has a first arcuate groove 131 lying over some of the ports 118 of the cylinders 111. The base 107 also has a second arcuate groove 132 lying over some of the remaining ports 118. The hydraulic motor 120 has the cylinders 121 formed along the circumference of the cylinder block 122. The base 107 (see FIG. 9) has a first arcuate groove 133 lying over some of the ports 128 of the cylinders 121. The base 107 also has a second arcuate groove 134 lying over some of the remaining ports 128. The first arcuate groove 131 above the pump and the first arcuate groove 133 above the motor are connected to each other by a first oil passage 135. The second arcuate groove 132 above the pump and the second arcuate groove 134 above the motor are connected to each other by a second oil passage 136.

FIGS. 10 and 11 show one of the two side disks 26 shown in FIG. 3. Referring to FIG. 10, the side disk 26 is composed of a disk portion 141 curved outwardly of the tiller 10 (see FIG. 1), a plurality of upstanding plates or lugs 142 attached to the inner surface of the disk portion 141 close to its outer edge for producing a greater amount of friction with the soil, and a boss 83 extending inwardly from the center of the disk portion 141. Each lug 142 has a base 143 attached to the disk portion 141, and an upstanding portion 144 projecting from the base 143. The upstanding portion 144 lies at an angle a of, for example, from 30° to 60° to a line RL extending along the radius of the disk. FIG. 10 also includes an arrow showing the direction of normal rotation of the side disk 26 in which the tiller 10 is moved forward. The upstanding portion 144 of each lug 142 is substantially rectangular, as shown in FIG. 11. The other side disk 26 is similar to the side disk 26 shown in FIG. 10, but the upstanding portion 144 of each of its lugs 142 has an angle of $-\alpha$ to the line RL, so that the inclination of its upstanding portions 144 relative to the direction of its normal rotation may be equal to that of the side disk 26 shown in FIG. 10. The inclination of the upstanding portions 144 of the lugs 142 on one side disk 26 at an angle of $\alpha$ to the lines RL and the inclination of the upstanding portions 144 of the lugs 142 on the other side disk 26 at an angle of $-\alpha$ to the lines RL as described enable each upstanding portion 144 to have a greater area of contact with the ground to thereby prevent the side disks 26 from sinking undesirably in the ground, while also striking against the ground more effectively to produce a greater traction, when the side disks 26 are rotated in the direction of their normal rotation, than in the event that $0° \leq \alpha < 30°$, or $60° < \alpha \leq 90°$.

Figure 12:
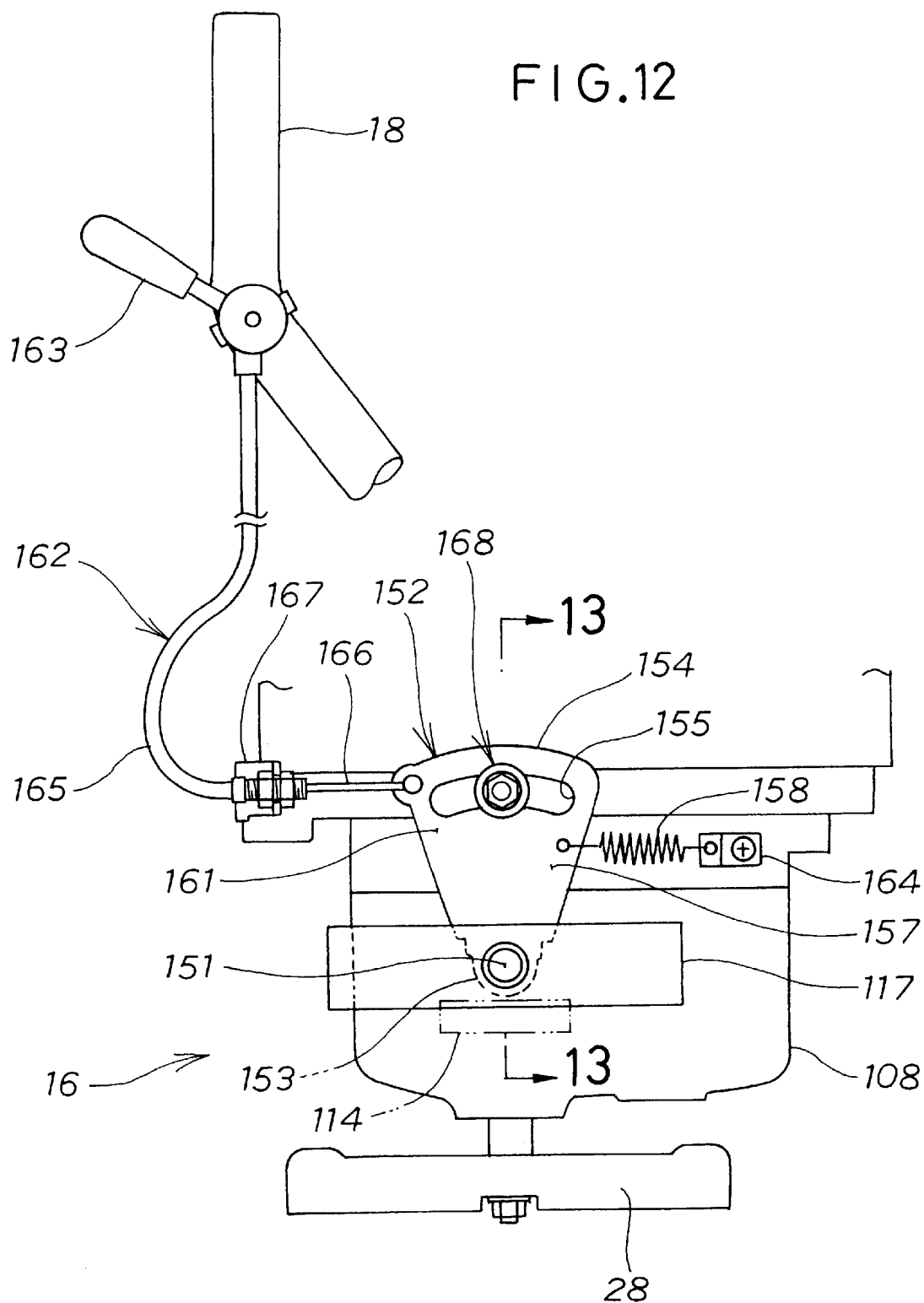
FIG. 12 is a view showing a mechanism for adjusting the hydrostatic transmission.

FIG. 12 is a top plan view of the HST for the tiller embodying this invention and a mechanism for adjusting the inclination of the inclined plate shown in FIG. 8. The inclined plate shaft 151 is rotatably mounted on the casing 108 of the HST 16. A sectorial lever 152 has a base end 153 secured to the shaft 151 to which the handle 117 for adjusting the inclination of the inclined plate is also secured. The lever 152 has an arcuate end 154 having an arcuate guide hole 155. The lever 152 has a side edge 157 to which a coiled tension spring 158 is fastened at one end. A wire 162 is connected at one end to the other side edge 161 of the lever 152. The other end of the wire 162 is connected to a lever 163 attached to the handlebar 18 for adjusting the inclination of the inclined plate by pulling the wire. The lever 152 is shown in its position in which the inclined plate 114 is not inclined, so that the inner shaft 71 (see FIG. 3) may be out of rotation, as will be explained. The other end of the spring 158 is fastened to the casing 108 by a fitting 164. The wire 162 has an outer tube 165, and an inner wire 166 inserted slidably in the outer tube 165. The outer tube 165 has one end secured to the casing 108 by a bracket 167. A friction generator 168 extends through the guide hole 155 and contacts the lever 152 on both sides thereof to produce a friction (or resistance) force when the lever 152 is swung.

Figure 13:
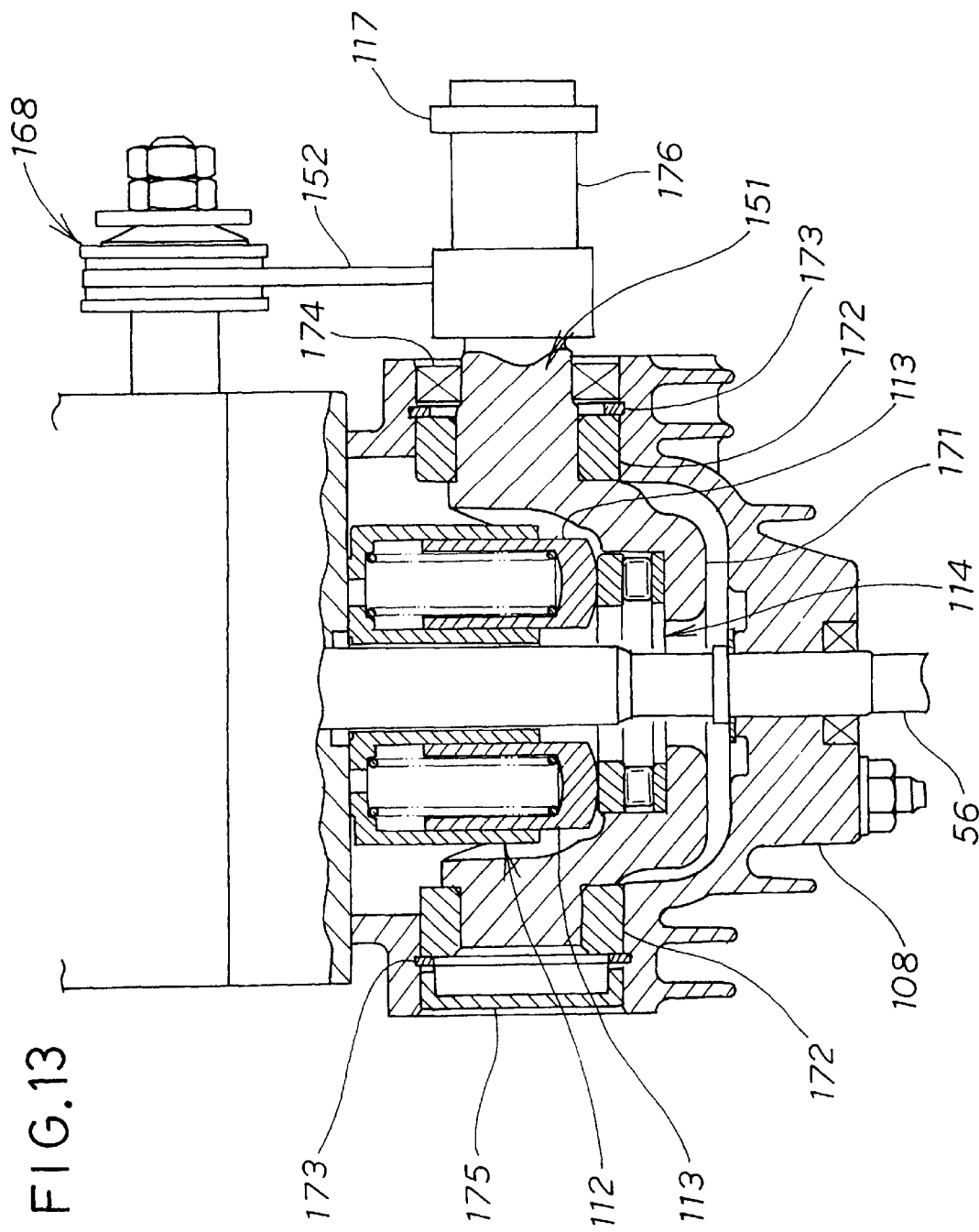
FIG. 13 is an enlarged sectional view taken along the line 13—13 of FIG. 12.

Referring to FIG. 13, the inclined plate shaft 151 is shaped like a crankshaft. It has a crank portion 171 to which the inclined plate 114 is mounted. The crank portion 171 is supported at both ends on the casing 108 by bearings 172. Stop rings for the bearings 172 are shown at 173, an oil seal at 174, and a plug at 175. A cylindrical member is shown at 176 for attaching the handle 117 for adjusting the inclination of the inclined plate and the lever 152 to the inclined plate shaft 151.

As is obvious from the foregoing, the inclination of the inclined plate 114 can be adjusted by using either the handle 117 or the lever 163 (FIG. 12). Description will now be made with reference to FIGS. 14A and 14B of a method in which the lever 163 is used for adjusting the inclination of the inclined plate 114.

If the lever 163 is turned counterclockwise from its position shown in FIG. 12 (as shown by phantom lines in FIG. 14A) to its position shown by solid lines, the wire 162 is loosened. The sectorial lever 152 is caused by the tensile force of the tension spring 158 to swing clockwise. The inclined plate shaft 151 secured to the base end of the lever 152 is rotated in the same direction with the lever 152, and the handle 117 secured to the shaft 151 is inclined by rotating in the same direction, whereby the inclined plate 114 is inclined into its position in which the inner shaft is rotated in the direction of its normal rotation (as will be described in further detail). If the lever 163 is turned clockwise from its position shown in FIG. 12 (as shown by phantom lines in FIG. 14B), the lever 152 is caused by the wire 162 to swing counterclockwise by overcoming the tensile force of the tension spring 158, as shown in FIG. 14B. The inclined plate shaft 151 is rotated in the same direction with the lever 152, and the handle 117 is inclined by rotating in the same direction, whereby the inclined shaft 114 is inclined into its position in which the inner shaft is rotated in the reverse direction (as will be described in further detail).

Figure 15:
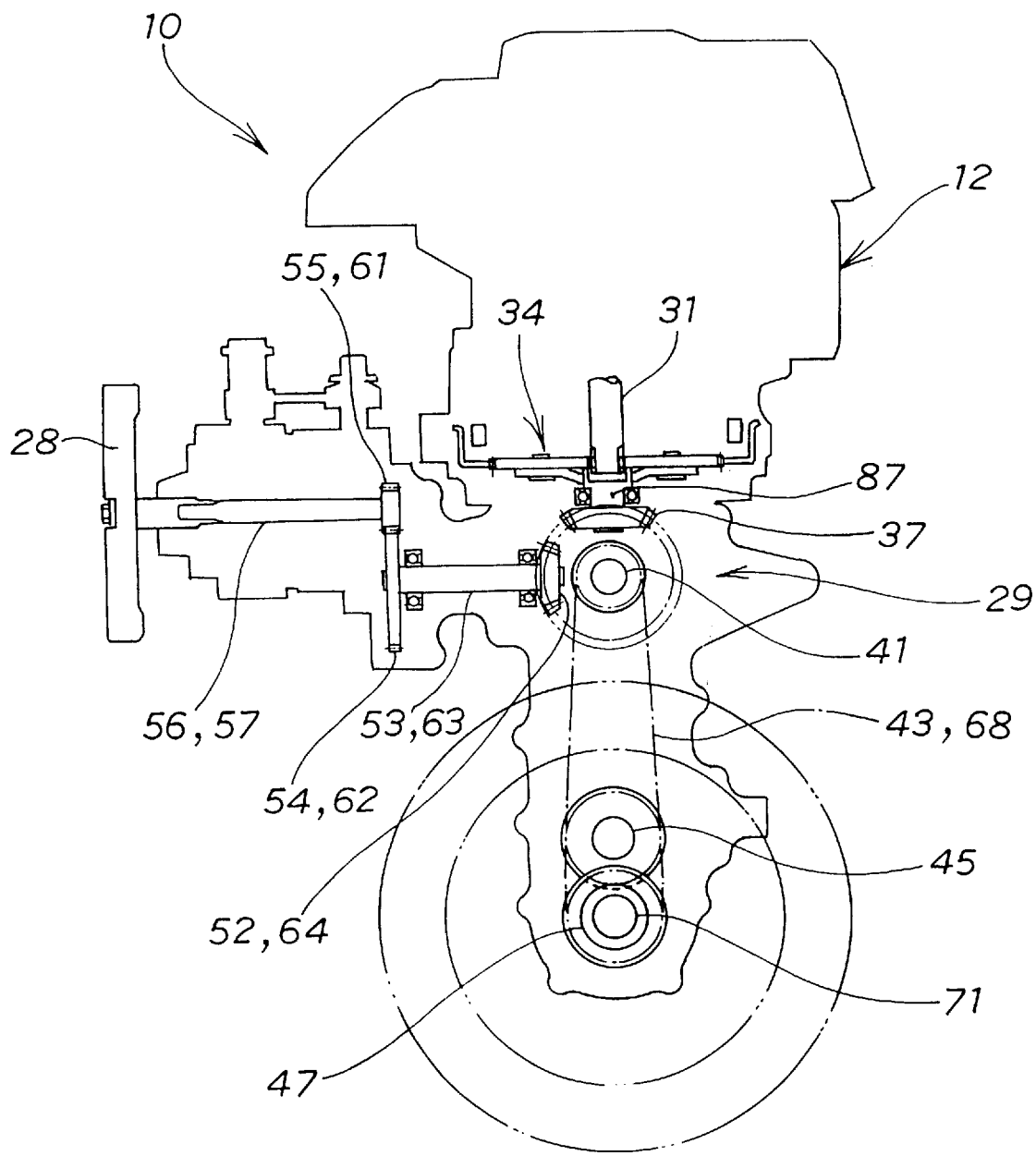
FIG. 15 is a view showing an arrangement of parts for power transmission.

FIG. 15 is a view showing the layout of parts for the power transmission in the tiller. The engine 12 in the tiller 10 is so mounted that its output shaft, or crankshaft 31 may be vertical. The shaft portion 87 of the planet carrier 34 and the first bevel gear 37 connected to the shaft portion 87 are positioned below the crankshaft 31 coaxially therewith. The pump and motor axles 56 and 57 extend horizontally toward the fan 28. The third supporting shaft 53 is connected to the pump axle 56 by the pump drive and driven gears 54 and 55, and extends horizontally toward the first supporting shaft 41. The third supporting shaft 53 terminates in the fourth bevel gear 52. The fourth supporting shaft 63 is connected to the motor axle 57 by the motor drive and driven gears 61 and 62, and likewise extends horizontally toward the first supporting shaft 41. The fourth supporting shaft 63 terminates in the fifth bevel gear 64. The first, fourth and fifth bevel gears 37, 52 and 64 are operationally connected to the first supporting shaft 41. The rotation of the first supporting shaft 41 is transmitted to the outer shafts 47 by the outer drive chain 43, and to the inner shaft 71 by the inner drive chain 68.

As the crankshaft 31 and the third and fourth supporting shafts 53 and 63 are all so mounted as to terminate adjacent to the first supporting shaft 41 from which a driving force is transmitted to the outer and inner shafts 47 and 71 mounted therebelow, the power transmission 29 of the tiller 10 is simple in construction, and is operable without causing any substantial mechanical loss. As the power transmission 29 is compact, the tiller 10 is small and light in weight, and is operable with an improved efficiency and a low fuel consumption.

Description will now be made of the operation of the power transmission 29 of the tiller 10 with reference to FIGS. 16 to 18.

(1) Description will first be made of the mode in which the outer and inner shafts 47 and 71 are both rotated in the normal direction. In FIG. 16, the direction of rotation of the crankshaft 31 of the engine 12 is shown as direction A, and the direction of normal rotation of the outer shafts 47 as direction B. The rotation of the crankshaft 31 in the direction A is transmitted by the crank gear 32 and the clutch mechanism 92 to rotate the shaft portion 87 of the planet carrier 34 in the direction A if the clutch mechanism 92 is in its engaged position. Its rotation is transmitted by the first and second bevel gears 37 and 38 to rotate the first supporting shaft 41 in direction RB (the reverse of direction B). Its rotation is transmitted by the outer drive sprocket 42, outer drive chain 43, and outer driven sprocket 44 to rotate the second supporting shaft 45 in the direction RB. Its rotation is transmitted by the outer drive and driven gears 46 and 48 to rotate the outer shafts 47 in the normal direction B. The rotation of the first supporting shaft 41 is also transmitted to the third supporting shaft 53 by the third and fourth bevel gears 51 and 52 to rotate it in direction RA (the reverse of direction A). Its rotation is transmitted by the pump drive and driven gears 54 and 55 to rotate the pump axle 56 in the direction A.

Figure 17A:
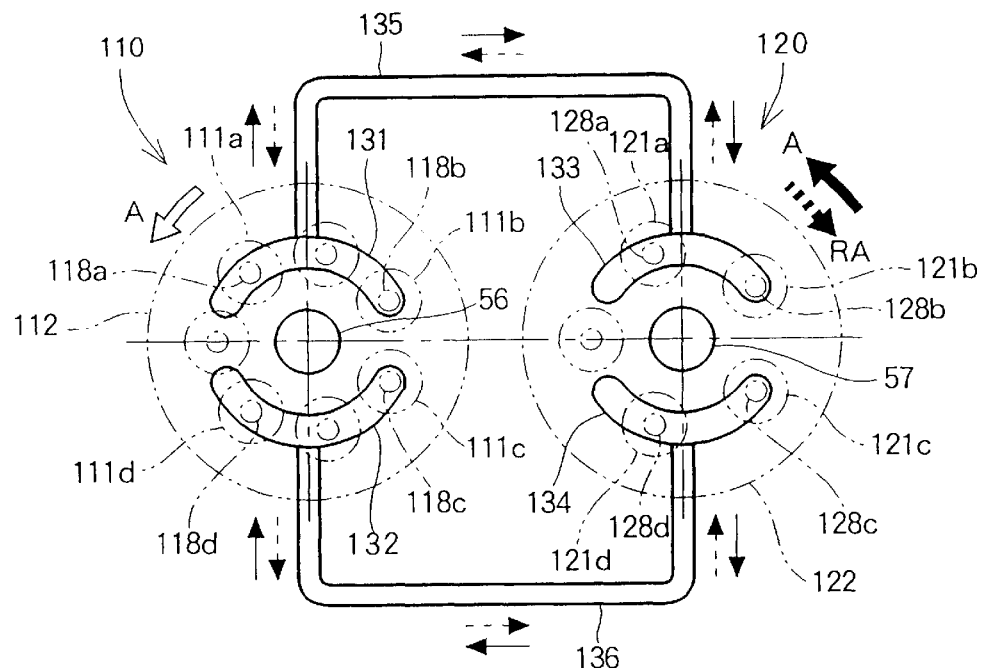
FIGS. 17A to 17C are a set of views showing the operation of the hydrostatic transmission.
Figure 17B:
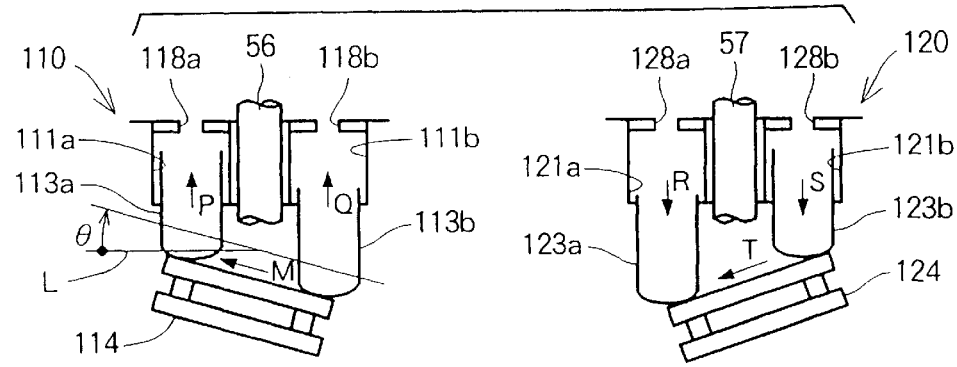
Figure 17C:
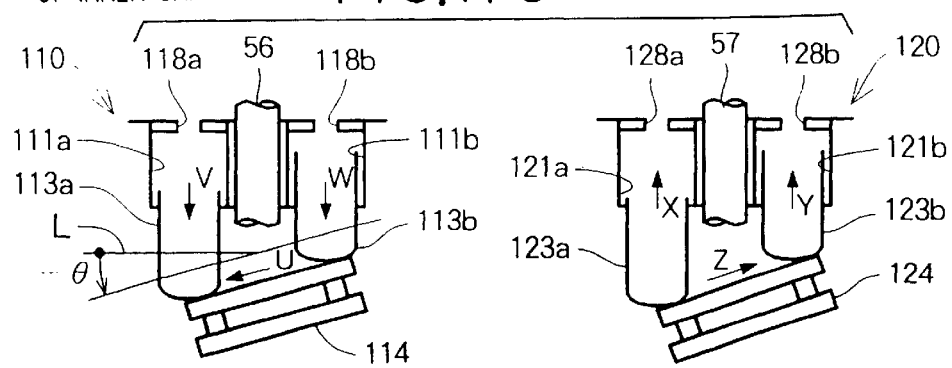

FIGS. 17A to 17C show the operation of the HST 16 in the power transmission of the tiller. FIG. 17A shows the flow of oil, and FIGS. 17B and 17C show the movements of the plungers 113 and the inclined plate 114 in the hydraulic pump 110 and the corresponding movements of the plungers 123 and the inclined plate 124 in the hydraulic motor 120. For the convenience of description, only four have been chosen from the cylinders 111, plungers 113, ports 118, cylinders 121, plungers 123, or ports 128 shown in FIGS. 8 and 9, and are shown at 111a to 111d, 113a to 113d (including 113c and 113d not shown), 118a to 118d, 121a to 121d, 123a to 123d (including 123c and 123d not shown), or 128a to 128d.

Figure 16:
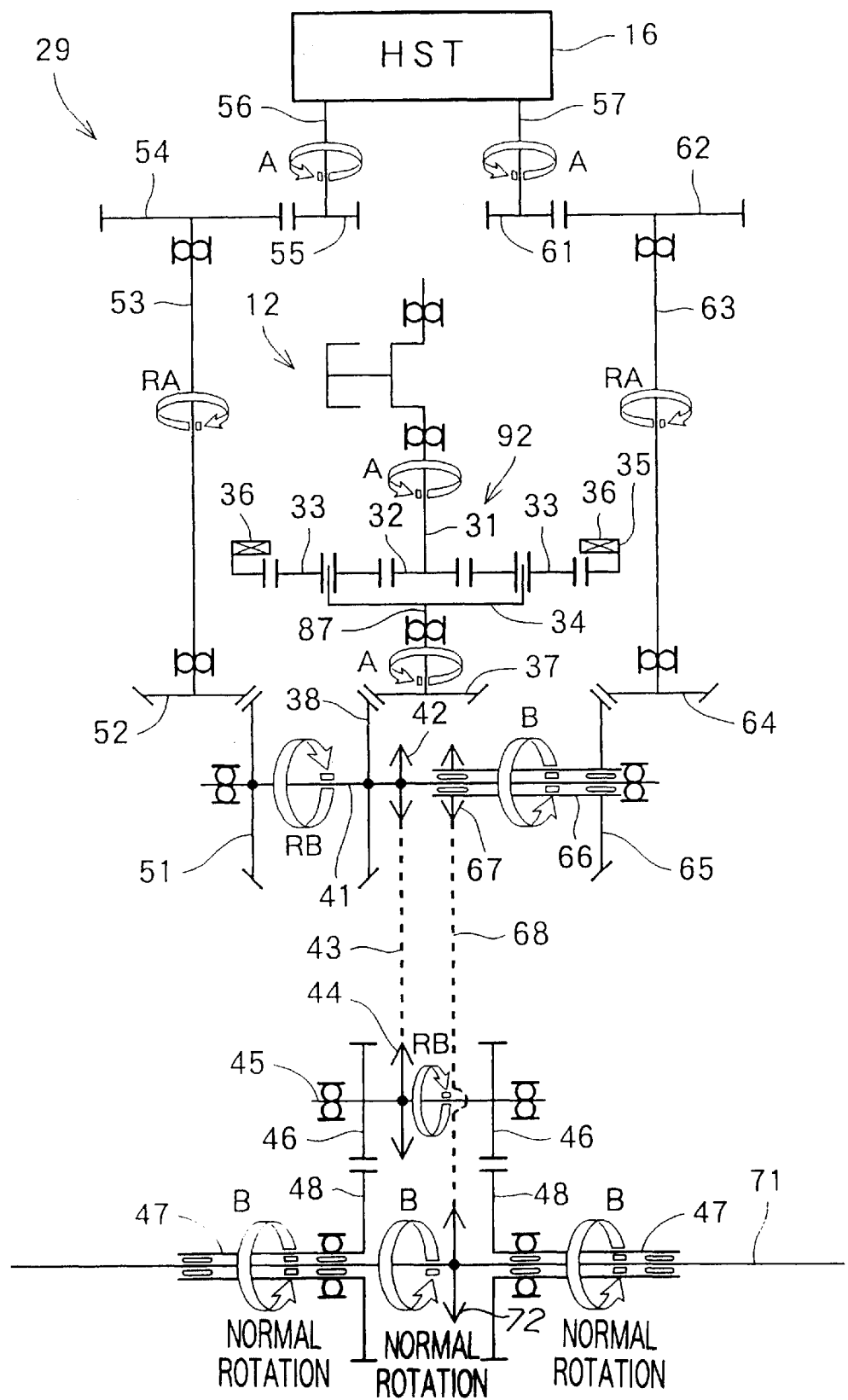
FIG. 16 is a diagram showing a first pattern of operation for the power transmission circuit shown in FIG. 2.

The rotation of the pump axle 56 for the hydraulic pump 110 in the direction A as shown in FIG. 16 causes the cylinder block 112 to rotate therewith in the direction A as shown by a white arrow in FIG. 17A. If the inclined plate 114 is inclined by the handle 117, or lever 163 shown in FIGS. 14A and 14B by an angle θ to a line L extending at right angles to the direction of movement of the plungers 113a and 113B as shown in FIG. 17B, the plungers 113a and 113b in the cylinders 111a and 111b facing the first arcuate groove 131 (FIG. 17A) move from right to left as shown by an arrow M in FIG. 17B, and retract into the cylinders 111a and 111b, respectively, as shown by arrows P and Q, while remaining in contact with the inclined plate 114. As a result, the oil in the cylinders 111a and 111b flows out through the ports 118a and 118b into the first arcuate groove 131 shown in FIG. 17A, and from the groove 131 into the first arcuate groove 133 above the motor through the first oil passage 135, as shown by arrows each having a solid line.

The oil flows from the first arcuate groove 133 into the cylinders 121a and 121b of the hydraulic motor 120 through the ports 128a and 128b, as shown in FIG. 17A. The plungers 123a and 123b project from the cylinders 121a and 121b, respectively, as shown by arrows R and S, and move from right to left as shown by an arrow T in FIG. 17B, while remaining in contact with the inclined plate 124. As a result, the cylinder block 122 is rotated in the direction A as shown by a thick solid arrow in FIG. 17A to cause the motor axle 57 to rotate in the same direction.

On the other hand, the plungers 113c and 113d in the cylinders 111c and 111d facing the second arcuate groove 132 above the hydraulic pump 110 as shown in FIG. 17A move in the opposite direction to the arrow M and project from the cylinders 111c and 111d, while remaining in contact with the inclined plate 114. The oil in the cylinders 121c and 121d of the hydraulic motor 120 flows out through the ports 128c and 128d, second arcuate groove 134 above the motor, second oil passage 136, second arcuate groove 132 above the pump, and ports 118c and 118d, as shown by arrows having a solid line, and is drawn into the cylinders 111c and 111d. As a result, the plungers 123c and 123d retract into the cylinders 121c and 121d, respectively.

As shown in FIG. 17B, as the inclined plate 114 has a larger angle θ of inclination, the plungers 113a to 113d of the hydraulic pump 110 have a higher speed of axial movement, and oil flows into and out of the cylinders 121a to 121d of the hydraulic motor 120 at a higher speed, so that the motor axle 57 has a gradually increasing speed of rotation in the direction A. As the inclined plate 114 has a smaller angle θ of inclination (θ>0), the plungers 113a to 113d of the hydraulic pump 110 have a lower speed of axial movement, and oil flows into and out of the cylinders 121a to 121d of the hydraulic motor 120 at a lower speed, so that the motor axle 57 has a gradually decreasing speed of rotation in the direction A. If the angle θ of inclination of the inclined plate 114 is reduced to zero, the plungers 113a to 113d cease to move relative to the cylinders 111a to 111d, oil ceases to flow between the hydraulic pump and motor 110 and 120, and the plungers 123a to 123d cease to move, so that the motor axle 57 stops its rotation.

Referring to FIG. 16, the rotation of the motor axle 57 in the direction A is transmitted by the motor drive and driven gears 61 and 62 to rotate the fourth supporting shaft 63 in the direction RA, and its rotation is transmitted by the fifth and sixth bevel gears 64 and 65 to rotate the fifth supporting shaft 66 in the direction B. Its rotation is transmitted by the inner drive sprocket 67, inner drive chain 68, and inner driven sprocket 72 to rotate the inner shaft 71 in the direction B of normal rotation.

Thus, as the inclination θ of the inclined plate 114 shown in FIG. 17B is increased by using the handle 117 shown in FIG. 8, the motor axle 57 of the HST 16 shown in FIG. 16 has a higher speed of rotation, and the inner shaft 71 has a gradually increasing speed of normal rotation. As the inclination θ of the inclined plate 114 is decreased (θ>0) by the handle 117, the motor axle 57 has a lower speed of rotation, and the inner shaft 71 has a gradually decreasing speed of normal rotation. If the inclination θ of the inclined plate 114 is kept at an appropriate angle by the handle 117, the outer and inner shafts 47 and 71 have an equal speed of normal rotation. Moreover, the inner shaft 71 stops its rotation if the inclination θ of the inclined plate 114 is reduced to zero by the handle 117.

(2) Description will now be made of the mode in which the outer shafts 47 are rotated in the normal direction, while the inner shaft 71 is rotated in the reverse direction. The normal rotation of the outer shafts 47 has already been described at (1) above, and no repeated description thereof is made. With regard to the reverse rotation of the inner shaft 71, the directions of rotation of the parts of the power transmission from the crankshaft 31 to the pump axle 56 have already been explained at (1) above with reference to FIG. 16, and no repeated description thereof is made, but description will be made of the directions of rotation of the parts after the motor axle 57. Description will first be made of the operation of the HST 16 with reference to FIGS. 17A and 17B.

The rotation of the pump axle 56 of the hydraulic pump 110 in the direction A as shown in FIG. 17A causes the cylinder block 112 to rotate therewith in the same direction. If the inclined plate 114 is inclined by using the handle 117, or lever 163 shown in FIGS. 14A and 14B by an angle of −θ to a line L as shown in FIG. 17C, the plungers 113a and 113b of the cylinders 111a and 111b facing the first arcuate groove 131 (FIG. 17A) above the pump move from right to left as shown by an arrow U in FIG. 17C, while remaining in contact with the inclined plate 114. As a result, the plungers 113a and 113b project from the cylinders 111a and 111b, respectively, as shown by arrows V and W. As a result, oil flows from the cylinders 121a and 121b of the hydraulic motor 120 to the first arcuate groove 131 above the pump through the ports 128a and 128b, the first arcuate groove 133 above the motor, and the first oil passage 135 as shown by broken arrows in FIG. 17A. The oil is drawn from the first arcuate groove 131 above the pump into the cylinders 111a and 111b of the hydraulic pump 110 through the ports 118a and 118b. As a result, the plungers 123a and 123b retract into the cylinders 121a and 121b, respectively, as shown by arrows X and Y, and are urged to move from left to right as shown by an arrow Z, while remaining in contact with the inclined plate 124.

On the other hand, the plungers 113c and 113d move in the opposite direction to the arrow U (FIG. 17C) and retract into the cylinders 111c and 111d facing the second arcuate groove 132 above the hydraulic pump 110 as shown in FIG. 17A, while remaining in contact with the inclined plate 114. As a result, oil flows from the cylinders 111c and 111d into the cylinders 121c and 121d through the ports 118c and 118d, the second arcuate groove 132 above the pump, the second oil passage 136, the second arcuate groove 134 above the motor and the ports 128c and 128d, as shown by broken arrows. As a result, the plungers 123c and 123d project from the cylinders 121c and 121d, and move from right to left in the opposite direction to the arrow Z (FIG. 17C), while remaining in contact with the inclined plate 124. Thus, the cylinder block 122 is rotated in the direction RA as shown by a thick broken arrow to rotate the motor axle 57 in the same direction.

As the inclined plate 114 shown in FIG. 17C has a smaller angle of −θ (or a larger degree of inclination to the negative side), the plungers 113a to 113d of the hydraulic pump 110 have a higher speed of axial movement and oil flows into and out of the cylinders 121a to 121d of the hydraulic motor 120 at a higher speed, so that the motor axle 57 has a gradually increasing speed of rotation in the direction RA (FIG. 17A). As the inclined plate 114 has a larger angle of −θ (θ>0) (or a smaller degree of inclination to the negative side), the plungers 113a to 113d of the hydraulic pump 110 have a lower speed of axial movement and oil flows into and out of the cylinders 121a to 121d of the hydraulic motor 120 at a lower speed, so that the motor axle 57 has a gradually decreasing speed of rotation in the direction RA.

Figure 18:
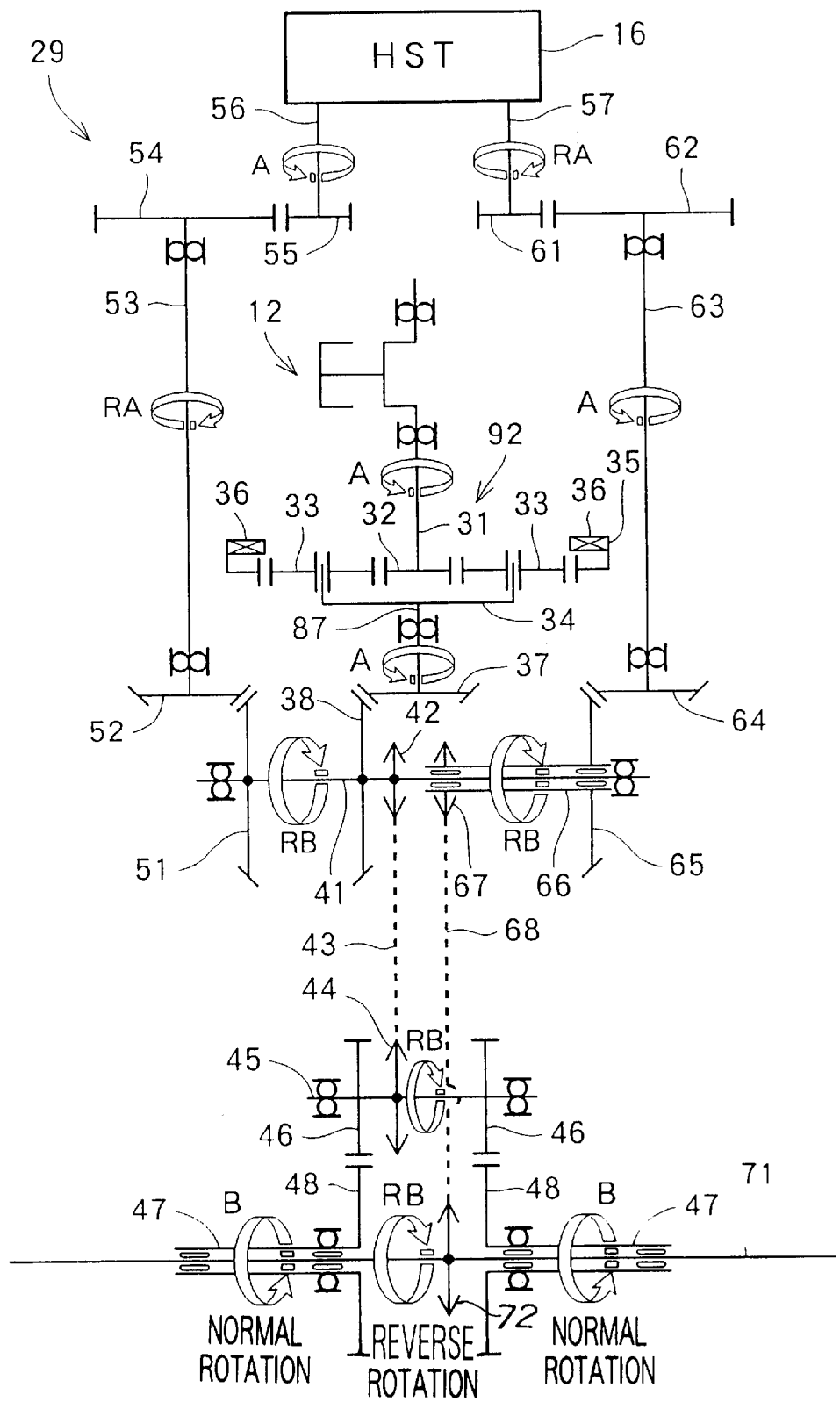
FIG. 18 is a diagram similar to FIG. 16, but showing a second pattern of operation.

Referring to FIG. 18, the rotation of the motor axle 57 in the direction RA is transmitted by the motor drive and driven gears 61 and 62 to rotate the fourth supporting shaft 63 in the direction A. Its rotation is transmitted by the fifth and sixth bevel gears 64 and 65 to rotate the fifth supporting shaft 66 in the direction RB. Its rotation is transmitted by the inner drive sprocket 67, inner drive chain 68, and inner driven sprocket 72 to rotate the inner shaft 71 in the direction RB opposite to the direction of rotation of the outer shafts 47.

Thus, as the inclination −θ of the inclined plate 114 shown in FIG. 17C is decreased, the motor axle 57 of the HST 16 has a gradually increasing speed of reverse rotation, and the inner shaft 71 also has a gradually increasing speed of reverse rotation. As the inclination −θ of the inclined plate 114 is increased (−θ<0) the motor axle 57 has a gradually decreasing speed of reverse rotation, and the inner shaft 71 has, therefore, a gradually decreasing speed of reverse rotation.

Figure 19A:
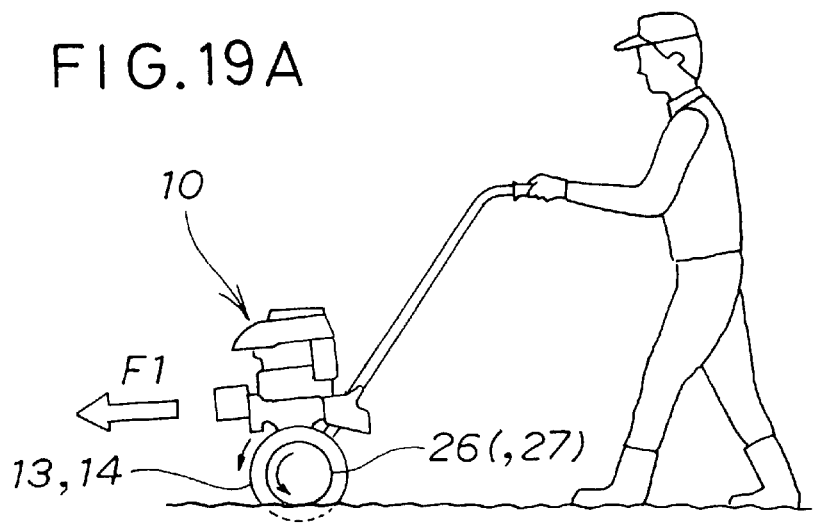
FIGS. 19A to 19C are a set of views for explaining the conditions which are suitable for the soil to be cultivated by the tiller embodying this invention.

Description will now be made with reference to FIGS. 19A to 19C of the operating conditions which are suitable for the soil to be cultivated by the tiller 10. If the soil is soft as shown in FIG. 19A, the outer and inner shafts are both rotated in the direction of normal rotation, and the inner shaft is rotated at a higher speed. This mode is obtained if the inclined plate is inclined by the handle, or lever over the angle at which the outer and inner shafts have an equal speed of rotation, as described before at (1) with reference to FIGS. 16, 17A and 17B. If the inner shaft has a higher speed of normal rotation, the tilling laws 13 and 14 attached to the outer shafts produce a smaller driving force on the soft soil. The side disks 26 attached to the inner shaft, however, produces a larger driving force, and the tilling claws 13 and 14 and the side disks 26 or 27 produce a larger total driving force F1 (as shown by a white arrow), so that the tilling claws 13 and 14 are moved forward at a higher speed without working the soil to any undesirably large depth. Thus, the tiller 10 has a higher tilling rate and a higher working efficiency.

Figure 19B:
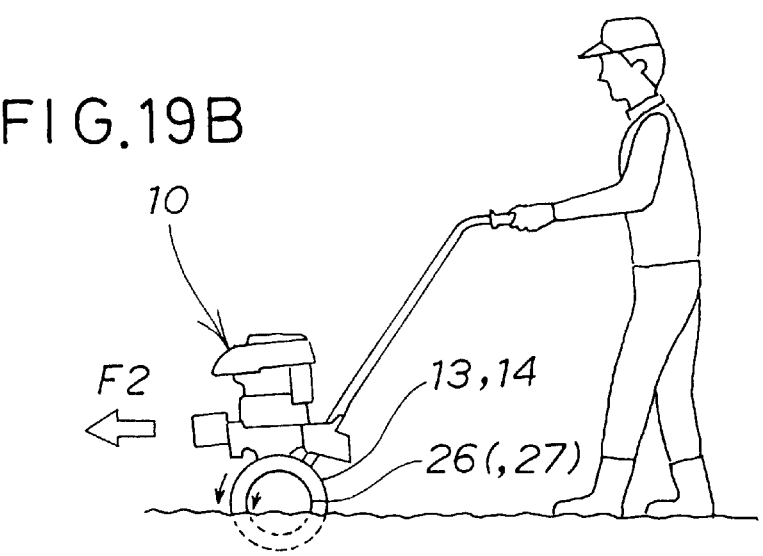

If the soil is hard as shown in FIG. 19B, the outer and inner shafts are both rotated in the direction of normal rotation, and the inner shaft is rotated at a lower speed. This mode is obtained if the inclined plate is inclined by an angle smaller than that at which the outer and inner shafts have an equal speed of rotation, as described before at (1) with reference to FIGS. 16, 17A and 17B. If the inner shaft has a lower speed of normal rotation, the tilling claws 13 and 14 produce a larger driving force on the hard soil. The side disks 26, however, produce a smaller driving force and resist the driving force of the claws 13 and 14. Thus, the claws 13 and 14 and the side disks 26 produce a smaller total driving force F2 (as shown by a white arrow), so that no dashing of the tiller 10 may occur. When the soil is hard, it is alternatively possible to hold the inner shaft against rotation, or place it in reverse rotation, so that the side disks 26 or 27 may produce a still greater resistance, depending on the nature of the field to be cultivated. In either event, the tiller 10 can do an adequate tilling job with a higher efficiency without any fear of dashing.

The side disks 26 or 27 are also placed in reverse rotation for moving the tiller 10 backward. The tiller 10 can be moved backward if the inner shaft is rotated in reverse direction, and sometimes at a higher speed, while the outer shafts are rotated in normal direction. When the tiller 10 has reached an edge of a rectangular field after working the soil along one ridge, for example, the lever for adjusting the inclination of the inclined plate is operated to rotate the side disks 26 or 27 in reverse direction to move back the tiller 10 to a position in which the tiller 10 can make a turn, and the lever is operated again to rotate the side disks 26 or 27 in normal direction, so that the tiller can work the soil along a neighboring ridge. The backward movement of the tiller 10 by the reverse rotation of the inner shaft as described ensures an improved working efficiency, as it facilitates the cultivation of the soil even along any edge or corner of a field which has hitherto been difficult.

Figure 19C:
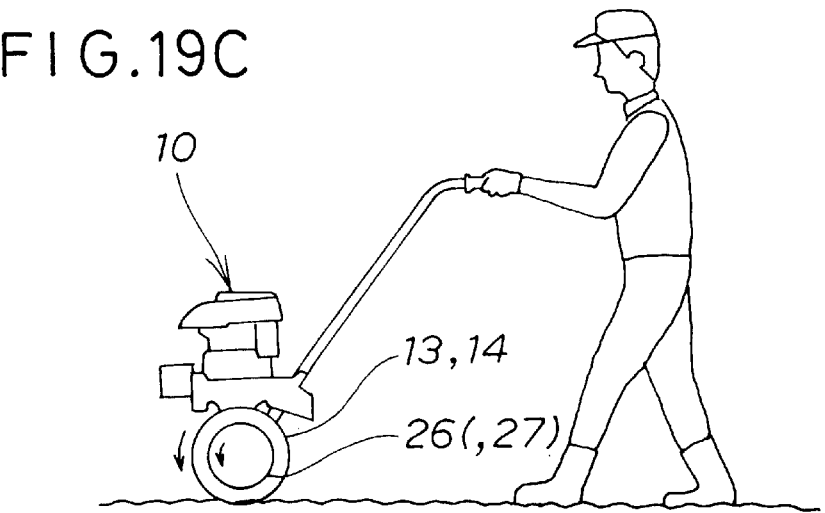

When the tiller 10 is, for example, transferred from one field to another as shown in FIG. 19C, the outer and inner shafts are both rotated in normal direction at a substantially equal speed. The tilling claws 13 and 14 and the side disks 26 or 27 are rotated at substantially the same speed to enable the tiller 10 to travel easily.

Although the foregoing description has been directed to the cases in which the soil is soft, or hard, and in which the tiller is transferred, it is not intended for limiting the scope of this invention, but it is alternatively possible to alter the rotating speed of the inner shaft and its direction of rotation in any other appropriate way depending on the nature of the soil to be cultivated. It is also possible to employ, for example, a throttle lever for varying the rotating speed of the outer shafts so that it may suit the nature of the soil. Although the hydrostatic transmission composed of a hydraulic pump and a hydraulic motor has been employed for changing the rotating speeds of the shafts, it is alternatively possible to employ a belt or traction drive type CVT for that purpose.

Obviously, various minor changes and modifications of the present invention are possible in the light of the above teaching. It is therefore to be understood that within the scope of the appended claims, the invention may be practiced otherwise than as specifically described.

What is claimed is:

1. A tiller for cultivating soil, the tiller comprising:
   a power source;
   a tilling shaft mounted for undergoing rotation by a driving force supplied from the power source, the tilling shaft having a hollow outer shaft and an inner shaft extending through the outer shaft, the inner shaft having a variable rotating speed and/or direction of rotation relative to the outer shaft;
   a power transmission mechanism for transmitting a driving force from the power source to the tilling shaft, the power transmission mechanism having a first power transmission system for transmitting a driving force from the power source to the outer shaft and a second power transmission system for transmitting a driving force from the power source to the inner shaft, the second power transmission system having a hydrostatic transmission comprised of a hydraulic pump and a hydraulic motor for varying the rotating speed and/or direction of rotation of the inner shaft; and
   a plurality of tilling claws disposed on the tilling shaft for tilling soil.

2. A tiller as set forth in claim 1; wherein the tilling claws are disposed around the outer shaft and the inner shaft.

3. A tiller as set forth in claim 1; wherein the inner shaft has a pair of side disks each connected to a respective one of two opposite ends of the inner shaft; and wherein the tilling claws are disposed around the outer shaft.

4. A tiller as set forth in claim 3; wherein each of the side disks has a plurality of lugs projecting from an inner surface thereof and extending at an angle relative to a radius of the side disk for increasing an amount of friction between the side disk and the soil.

5. A tiller comprising: a casing; a power source mounted on the casing; a tilling shaft mounted on the casing and connected to be rotationally driven by a driving force from the power source, the tilling shaft having a hollow outer shaft and an inner shaft extending through the outer shaft; a plurality of tilling claws mounted on the tilling shaft for tilling soil during rotation of the tilling shaft; and power transmitting means for transmitting the driving force from the power source to the tilling shaft and for selectively varying at least one of a speed of rotation and a direction of rotation of the inner shaft relative to the outer shaft, the power transmitting means comprising a first power transmission system for transmitting a driving force from the power source to the outer shaft and a second power transmission system for transmitting a driving force from the power source to the inner shaft, and the second power transmission system having a hydrostatic transmission for varying one of the speed of rotation and the direction of rotation of the inner shaft relative to the outer shaft.

6. A tiller according to claim 5; wherein the hydrostatic transmission comprises a hydraulic pump and a hydraulic motor.

7. A tiller comprising: a casing; a power source mounted on the casing; a tilling shaft mounted on the casing and connected to be rotationally driven by a driving force from the power source, the tilling shaft having a hollow outer shaft and an inner shaft extending through the outer shaft; a plurality of tilling claws mounted on the outer shaft for rotation therewith for tilling soil during rotation of the tilling shaft; a pair of disk members each connected to a respective one of two opposite ends of the inner shaft for rotation therewith to engage the soil during tilling of the soil; and power transmitting means for transmitting the driving force from the power source to the tilling shaft and for selectively varying at least one of a speed of rotation and a direction of rotation of the inner shaft relative to the outer shaft.

8. A tiller according to claim 7; further comprising a plurality of lug members projecting from a surface of each of the disk members for increasing an amount of friction between the disk members and the soil during tilling of the soil.

9. A tiller according to claim 8; wherein each of the lug members has a base portion connected to a respective one of the disk members and an upstanding portion extending from the base portion.

10. A tiller comprising: a power source; a tilling shaft connected to be rotationally driven by a driving force from the power source, the tilling shaft having first and second shaft portions rotatable at different speeds and/or directions from one another; a plurality of tilling claws mounted on the second shaft portion for rotation therewith to till soil during a tilling operation; a pair of disk members each connected to a respective one of two opposite ends of the first shaft portion for rotation therewith; and power transmitting means for selectively varying the speed and/or direction of rotation of the first shaft portion relative to the second shaft portion during the tilling operation.

11. A tiller according to claim 10; further comprising a plurality of lug members projecting from a surface of each of the disk members for increasing an amount of friction between the disk members and the soil.

12. A tiller according to claim 10; wherein the power transmitting means comprises a first power transmission system for transmitting a driving force from the power source to the second shaft portion and a second power transmission system for transmitting a driving force from the power source to the first shaft portion.

* * * * *